US 9,785,388 B2

(12) United States Patent
Nishikawa

(10) Patent No.: US 9,785,388 B2
(45) Date of Patent: Oct. 10, 2017

(54) IMAGE PROCESSING APPARATUS, INCLUDING LOAD DECIDING, AND IMAGE PROCESSING METHOD

(71) Applicant: CANON KABUSHIKI KAISHA, Tokyo (JP)

(72) Inventor: Naoyuki Nishikawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/943,071

(22) Filed: Nov. 17, 2015

(65) Prior Publication Data
US 2016/0139862 A1    May 19, 2016

(30) Foreign Application Priority Data

Nov. 18, 2014  (JP) .................................. 2014-233765

(51) Int. Cl.
*G06F 3/12* (2006.01)
*G06K 15/02* (2006.01)
(Continued)

(52) U.S. Cl.
CPC ............ *G06F 3/1245* (2013.01); *G06F 3/122* (2013.01); *G06F 3/1211* (2013.01);
(Continued)

(58) Field of Classification Search
None
See application file for complete search history.

(56) References Cited

U.S. PATENT DOCUMENTS 7,466,465 B2 *  12/2008  Yamazaki ............. G06F 9/3814
                                                          358/1.9
8,736,871 B2     5/2014  Nishikawa
(Continued)

FOREIGN PATENT DOCUMENTS

JP          04170686 A      6/1992
JP       2003051019 A      2/2003
(Continued)

OTHER PUBLICATIONS

Rogers, "Procedural Elements for Computer Graphics", Digital Differential Analyzer, McGraw-Hill Education, pp. 28-34, 1997.

*Primary Examiner* — Thomas D Lee
(74) *Attorney, Agent, or Firm* — Rossi, Kimms & McDowell LLP

(57) ABSTRACT

Image processing apparatus and method capable of performing high-speed printing while suppressing an increase of memory size are provided. The image processing apparatus comprises: a page processing unit to perform processes of a plurality of pages in parallel; a load deciding unit to detect a load level in the page processing unit, for each page; and a controlling unit to control the page processing unit depending on a detection result by the load deciding unit, wherein the page processing unit assigns a thread of an edge extraction process to one or more image data in the page to be processed, and synthesizes an edge of each image data extracted by the thread, and the controlling unit comprises a thread priority order designating unit configured to designate priority order of the thread assigned by the page processing unit, depending on a result of the detection by the load deciding unit.

8 Claims, 21 Drawing Sheets

(51) Int. Cl.
    *H04N 1/40*    (2006.01)
    *H04N 1/00*    (2006.01)
(52) U.S. Cl.
    CPC ....... *G06F 3/1284* (2013.01); *G06K 15/1857*
            (2013.01); *H04N 1/00* (2013.01); *H04N 1/40*
                    (2013.01); *G06K 15/1856* (2013.01)

(56) References Cited

U.S. PATENT DOCUMENTS

2006/0197999 A1* 9/2006 Murakami ............... G06T 11/20
                                                              358/538
2012/0229834 A1* 9/2012 Nishikawa ......... G06K 15/1822
                                                              358/1.13

FOREIGN PATENT DOCUMENTS

| JP | 2006155308 A | 6/2006 |
| JP | 2011034139 A | 2/2011 |

* cited by examiner

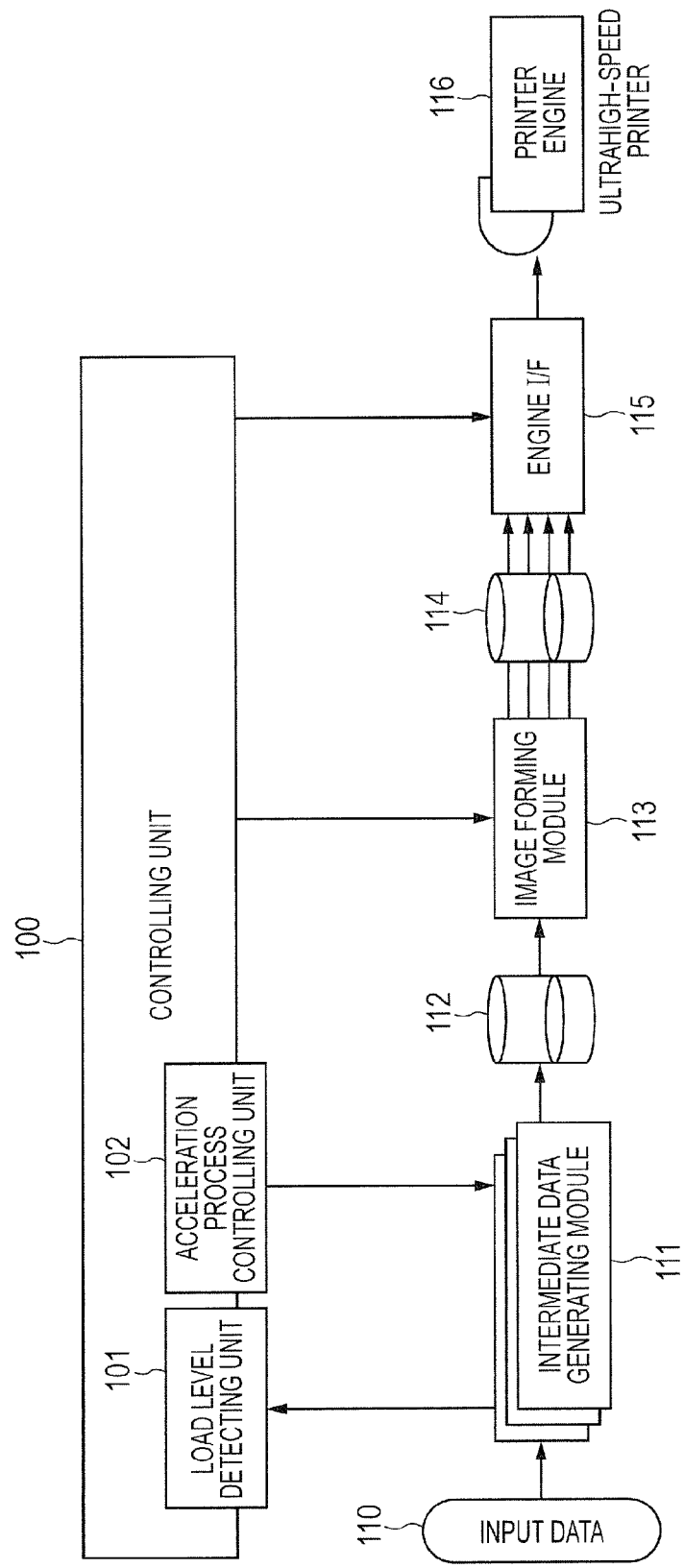

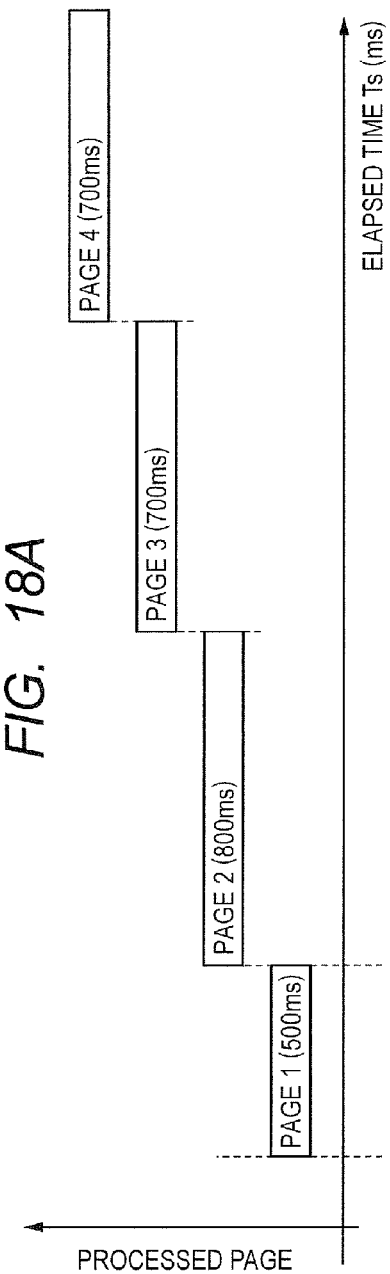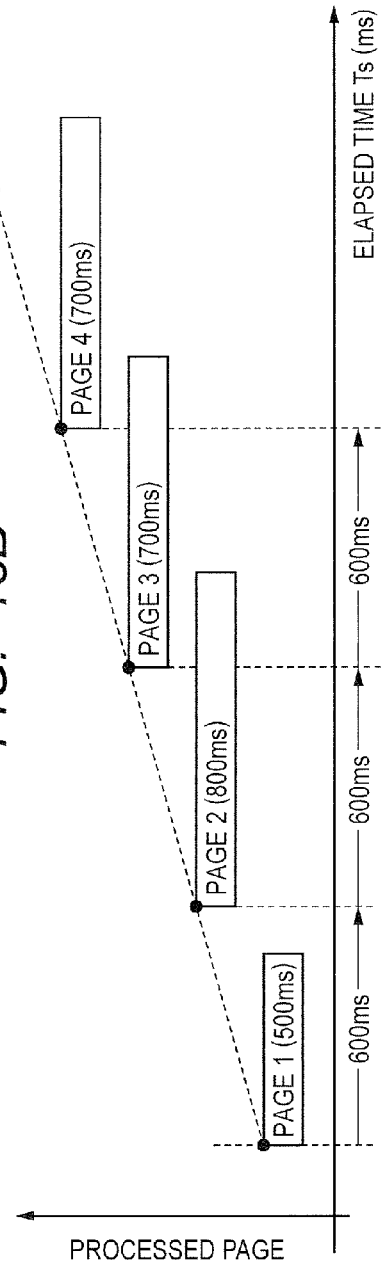

IMAGE PROCESSING APPARATUS, INCLUDING LOAD DECIDING, AND IMAGE PROCESSING METHOD

BACKGROUND OF THE INVENTION

Field of the Invention

The present invention relates to image processing apparatus and method which are suitable for various kinds of printing such as character printing, photograph printing, figure printing and the like. Particularly, the present invention relates to the image processing apparatus and method which are related to a high-speed process for figure drawing.

Description of the Related Art

Conventionally, in order to draw a figure, a rendering method of extracting contour information (also called edge information) of the figure from the coordinate information or the like of the figure and forming an image based on the extracted contour information has been generally and widely used (e.g., Japanese Patent Application Laid-Open No. H04-170686). Here, the contour information is represented by a straight line, and a DDA (digital differential analyzer) algorithm has been known as a method of representing the straight line (David Rogers, "Procedural Elements for Computer Graphics", McGraw-Hill Education).

In general, it is important in the rendering process to be able to always perform the drawing process at high speed. However, since time actually required for the rendering process changes depending on kinds and the number of figures, it is not easy to achieve the high-speed drawing process.

FIG. 1 is a graph indicating examples of changes of data process time in a print job including the above rendering process. In FIG. 1, the vertical axis shows the process time (milliseconds: ms) and the horizontal axis shows the pages of the print job. In the example of FIG. 1, it takes about 400 ms for completing the process of the first page, and it takes about 550 ms for completing the process of the second page. In FIG. 1, the line graph which is constantly changed at the respective triangular points indicates the number (relative value) of the simple figures included in the job, and the line graph which is constantly changed at the respective circular points indicates the number (relative value) of the figures other than the simple figures (called complex figures, as a matter of convenience). Here, the simple figure is a simple and plain figure such as a rectangle, a triangle, etc., and the complex figure includes a polygon more than a pentagon. Incidentally, it is assumed that the print job covering a plurality of pages is analyzed. Here, in both the case where the simple figure is included and the case where the complex image is included, it can be confirmed that these cases basically have the similar correlations in regard to the number of graphic objects although the data process time is different from each other. Many kinds of techniques intended to increase rendering process speed for the data group such as the above print job have been proposed (e.g., Japanese Patent Application Laid-Open No. 2003-51019, Japanese Patent Application Laid-Open No. 2011-34139 and Japanese Patent Application Laid-Open No. 2006-155308).

FIG. 2 is a block diagram illustrating the configuration of a conventional image processing apparatus. In the conventional image processing apparatus, when printing is started, input data (PDL (page description language) data) 910 is transferred to an intermediate data generating module 911, and a PDL interpreter process, a drawing process (contour extraction) and the like are performed to the transferred data by the intermediate data generating module 911. Then, graphics data in each page is converted into data (hereinafter, called intermediate data) of a format suitable for a later-stage image forming process. The intermediate data might be called a display list or the like. The intermediate data is once stored in an intermediate data spooler 912, and then transferred to a later-stage image forming module 913. The image forming module loads pixel data into a memory based on information of the intermediate data. The pixel data loaded into the memory is once stored in a bitmap data buffer memory 914, and then transferred to a printer engine 916 via an engine I/F (interface) 915. The intermediate data generating module 911, the image forming module 113 and the engine I/F 915 are controlled by a controlling unit 900.

In a print system including the image processing apparatus, when the printer engine is started and thus printing is once started, the printer engine cannot easily be stopped. For this reason, even if any kind of data is input, it is necessary to supply the print data at certain speed. Therefore, in a case where the input data largely vary depending on time fluctuation, it is necessary to increase the amount of the data to be spooled and thus increase the memory size to be used for the spooler. However, the increase of the memory size is directly linked to the increase of the costs for the image processing apparatus.

In consideration of such a problem as above, the technique of changing the schedule of a print process (rendering process) by predicting the time necessary for the process is disclosed in, e.g., Japanese Patent Application Laid-Open No. 2006-155308, and a desired object can certainly be achieved by this technique. However, in case of actually trying to change over the processes based on such a predicted value, it can be understood that the prediction itself for process speed is not easy.

The present invention aims to provide image processing apparatus and method capable of performing high-speed printing while suppressing the increase of the memory size.

In case of changing the schedule of the print process by predicting the time necessary for the process, the information related to the number of graphics included in a page to be processed is obtained before the actual process is started. In general, there is a tendency that the time necessary for processing a page becomes longer in proportion to the number of graphics included in the relevant page. FIG. 3 is a graph indicating an example of the relation between the number of graphics included in each page of PDL data in test data and process time. It can be understood from FIG. 3 that the process time becomes longer comprehensively in proportion to the number of graphics. Besides, when the individual data are compared, it can be read that it is not easy to directly use the individual data for predicting the process time. For example, a page i includes 1500 graphic objects (figures) and it takes about 100 ms for processing this page, whereas a page j includes 2000 graphic objects and it takes about 50 ms for processing this page. Namely, in this example, the number of graphic objects of the page j is 4/3 times the number of graphic objects of the page i, but the process time for the page j is about ½ of the process time for the page i.

On the basis of such a verification result as above, the present inventor has performed the verification by simulation for the purpose of investigating the influence of diremption between the predicted time and the actual process time on the characteristic of the image processing apparatus.

FIG. 4 is a graph illustrating the result obtained when the numbers of initial spools necessary to prevent an engine stall in the image processing apparatus illustrated in FIG. 2 are inspected by the simulation.

In the graph of FIG. 4, the horizontal axis shows the percentage (heavy page content percentage) of pages for which the respective processes are heavy (hereinafter, also called heavy pages) in a job, and the vertical axis shows the number of pages necessary for the initial spool. Here, the heavy page implies the page for which the process load is heavy, and it is possible, depending on a use or the like of the image processing apparatus, to properly determine whether or not a certain page corresponds to the heavy page. Incidentally, the concrete definition of the heavy page is different depending on each condition. For example, in a printer for which printing speed of 100 PPM (page per minute) is required, the page for which it takes process time of one second or more can be defined as the heavy page. Besides, the page for which it takes process time equal to or longer than a threshold (1.5σ) properly set by grasping the process time group of each page in print data based on normal distribution for the purpose of abstraction might be defined as the heavy page. In the example of FIG. 4, the page for which it takes the process time of one second or more is defined as the heavy page.

In the illustrated simulation, the page process time is randomly generated, the prediction time in the case where accurate prediction is possible (mistake percentage: 0%) and the prediction times in the cases where accurate prediction is impossible (mistake percentages: 10%, 20%) are compared, and the differences in these cases are studied. As the basic operation of the image processing apparatus, in the case where the process page is the heavy page, the present inventor observed the actions of the apparatus by applying an acceleration process to the process time for the heavy page based on each prediction of page time. Here, in the simulation, the acceleration process was performed on the condition that the process was completed in half the time or so.

In FIG. 4, a line A (the double line including the square points) represents the number of initial spools in the case where the process prediction time before the print process is always correct, that is, the characteristic in the case where the prediction mistake percentage is 0%. A line B (the dashed line including the black triangular points) represents the characteristic in the case where the prediction mistake percentage is 10%, and a line C (the solid line including the white triangular points) represents the characteristic in the case where the prediction mistake percentage is 20%. Here, the mistake percentage indicates accuracy of the prediction time for the print process time. More specifically, the mistake percentage indicates the percentage of misprediction (i.e., the state that prediction became wrong by a certain value ±10% or more) in the total number of pages. Here, it is assumed that the number of pages which could be processed as predicted is P1, and the number of pages which could not be within the prediction is P2 (the number of prediction mistake pages). Then, the mistake percentage is given by "P2/(P1+P2)×100".

According to the result of this simulation, in the case where the heavy page content percentage is about 14%, when the prediction mistake percentage is 0%, then the printer engine can operate without any stall if about 190 pages are stored as the number of initial spools. On the other hand, when the prediction mistake percentage is 10%, about 530 pages are necessary as the number of initial spools. Further, when the prediction mistake percentage is 20%, about 750 pages are necessary as the number of initial spools. That is, when the control is performed according to the result of the prediction of which the accuracy is not high, a large-sized memory is necessary for the spooler, so that the costs inevitably increase. In other words, since the spooler capacity has been determined experientially or experimentally in the conventional image processing apparatus, the waste costs have occurred without any analysis and devisal for the capacity reduction.

SUMMARY OF THE INVENTION

The present inventor has reached the following various aspects of the invention as a result of earnest investigation based on such knowledges as described above.

An image processing apparatus according to the present invention is characterized by comprising: a page processing unit configured to perform processes of a plurality of pages in parallel; a load deciding unit configured to detect a load level in the page processing unit, for each page; and a controlling unit configured to control the page processing unit depending on a detection result by the load deciding unit, wherein the page processing unit assigns a thread of an edge extraction process to one or more image data included in the page to be processed, and synthesizes an edge of each image data extracted by the thread, and the controlling unit comprises a thread priority order designating unit configured to designate priority order of the thread assigned by the page processing unit, depending on a result of the detection by the load deciding unit.

An image processing method according to the present invention is characterized by comprising: a page processing step of performing processes of a plurality of pages in parallel; a load deciding step of detecting a load level in the page processing step, for each page; and a controlling step of performing control of the page processing step depending on a detection result in the load deciding step, wherein, in the page processing step, a thread of an edge extraction process is assigned to one or more image data included in the page to be processed, and an edge of each image data extracted by the thread is synthesized, and the controlling step comprises a thread priority order designating step of designating priority order of the thread assigned in the page processing step, depending on a result of the detection in the load deciding unit.

According to the present invention, since the priority order of the thread is designated depending on the load level, it is possible to prevent a variation in the load level. Thus, it is possible, even in case of performing high-speed process, to suppress the memory size to be prepared for a spooler.

Further features of the present invention will become apparent from the following description of exemplary embodiments with reference to the attached drawings.

BRIEF DESCRIPTION OF THE DRAWINGS

FIG. 5 is a block diagram illustrating a function constitution of an image processing apparatus according to the first embodiment.

FIG. 18A is a diagram illustrating a page process schedule of a general image processing apparatus, and FIG. 18B is a diagram illustrating a page process schedule of an image processing apparatus according to the third embodiment.

DESCRIPTION OF THE EMBODIMENTS

Figure 1:
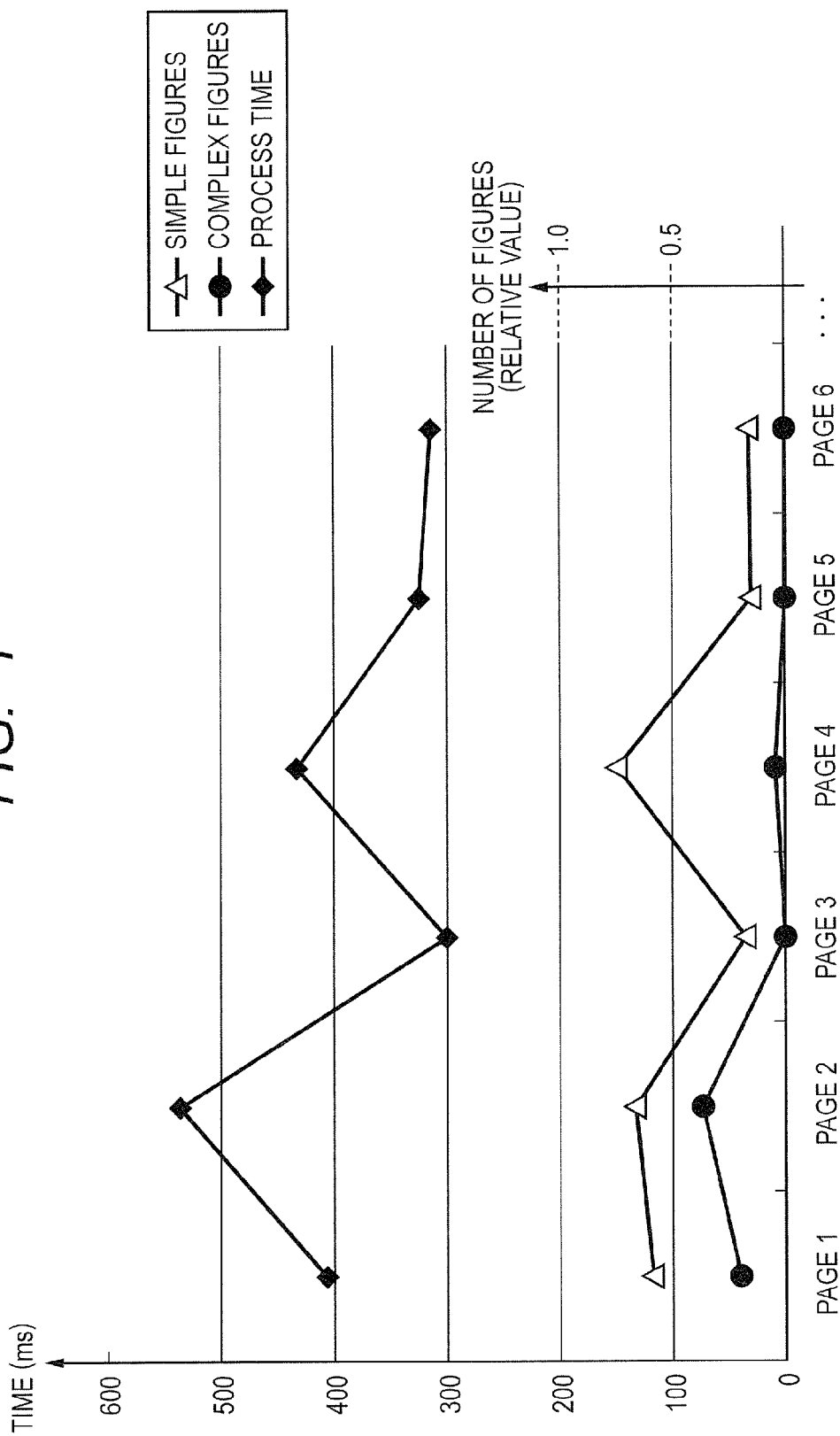
FIG. 1 is a graph indicating examples of changes of data process time.

Hereinafter, preferred embodiments of the present invention will now be described in detail in accordance with the accompanying drawings.

First Embodiment

Initially, the first embodiment will be described. Here, FIG. 5 is a block diagram illustrating a function constitution of an image processing apparatus according to the first embodiment.

The image processing apparatus according to the first embodiment includes a controlling unit 100, an intermediate data generating module 111, an intermediate data spooler 112, an image forming module 113, a bitmap data buffer memory 114 and an engine I/F 115. Further, the controlling unit 100 includes a load level detecting unit 101 and an acceleration process controlling unit 102. The intermediate data generating module 111 is an example of a page processing unit, the load level detecting unit 101 is an example of a load deciding unit, and the acceleration process controlling unit 102 is an example of a controlling unit.

In the first embodiment, PDL data is input as input data 110 to the intermediate data generating module 111, and, in the input data, the data such as figure data or the like is once converted into contour data or the like and is then temporarily stored in the intermediate data spooler 112. The controlling unit 100 transmits/receives control signals among the intermediate data generating module 111, the image forming module 113 and the engine I/F 115, thereby controlling the intermediate data generating module 111, the image forming module 113 and the engine I/F 115. In the control of the intermediate data generating module 111, the load level detecting unit 101 detects the load level of the page to be processed at that point. The actual load level detection will later be described in detail. In the present embodiment, three kinds of load levels are defined, that is, the lightest load level is defined as the level 1, the heaviest load level is defined as the level 3, and the intermediate load level is defined as the level 2. For example, the page for which the load level is the level 1 is the page which can be processed within less than 600 ms, the page for which the load level is the level 3 is the page for which the process time of is or more is necessary, and the page for which the load level is the level 2 is the page for which the process time of 600 ms or more and less than is. In other words, when the page for which the load level is the level 1 is processed, the process of 50% or more is completed at the point that the process time of 300 ms elapses from the process start.

In the present embodiment, the image processing apparatus proceeds with the process as causing the load level detecting unit 101 to measure the halfway progress of the actual process in real time. Based on the load level, i.e., the detection result, detected by the load level detecting unit 101, the acceleration process controlling unit 102 adaptively adjusts the individual process capability of each of the intermediate data generating modules 111 by changing over the core assignment number of the CPU. Incidentally, when the intermediate data is spooled in the intermediate data spooler 112, the relevant intermediate data is input in sequence to the image forming module 113, and the pixel data is loaded into the bitmap data buffer memory (video memory) 114. Then, the relevant data is output as image data to a printer engine 116 via the engine I/F 115.

Figure 6A:
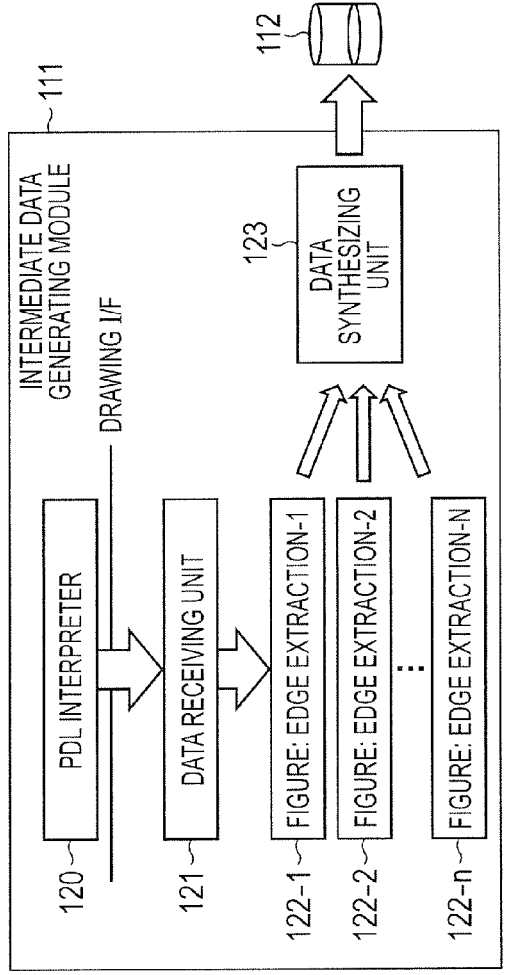
FIG. 6A is a diagram illustrating a function configuration of an intermediate data generating module.

Subsequently, the intermediate data generating module 111 will be described in detail. FIG. 6A is a diagram illustrating the function configuration of the intermediate data generating module 111, and FIG. 6B is a diagram illustrating the process to be performed by the intermediate data generating module 111.

As illustrated in FIG. 6A, a PDL interpreter 120 is included in the intermediate data generating module 111. The input data 110 is decrypted by the PDL interpreter 120, and the decrypted PDL data is transferred to the print system side via a drawing I/F. On the print system side, a data receiving unit 121 receives the PDL objects such as a figure, a character, an image and the like, properly accumulates the received data in an internal spooler (not illustrated), and then transfers the data to later-stage processing units. For example, if the PDL object is the image, the data of the relevant image is transferred to a not-illustrated image processing unit (image processing thread). If the PDL object is the figure, the data of the figure is transferred to edge extraction processing units (edge extraction processing threads) 122-1 to 122-*n*. At this time, if two or more figures exist on one page, the edge extraction processing thread is assigned to each of the figures. Then, the edge data extracted by each edge extraction process is properly transferred to a later-stage data synthesizing unit (data synthesis processing thread) 123, and the transferred data is synthesized on the page (i.e., a superposition process) and formatted to the tiled data. The formatted data is written in the intermediate data spooler 112 as the intermediate data. Then, the intermediate data written in the intermediate data spooler 112 is transferred to the engine I/F 115 via the image forming module 113 and the bitmap data buffer memory 114.

Figure 2:
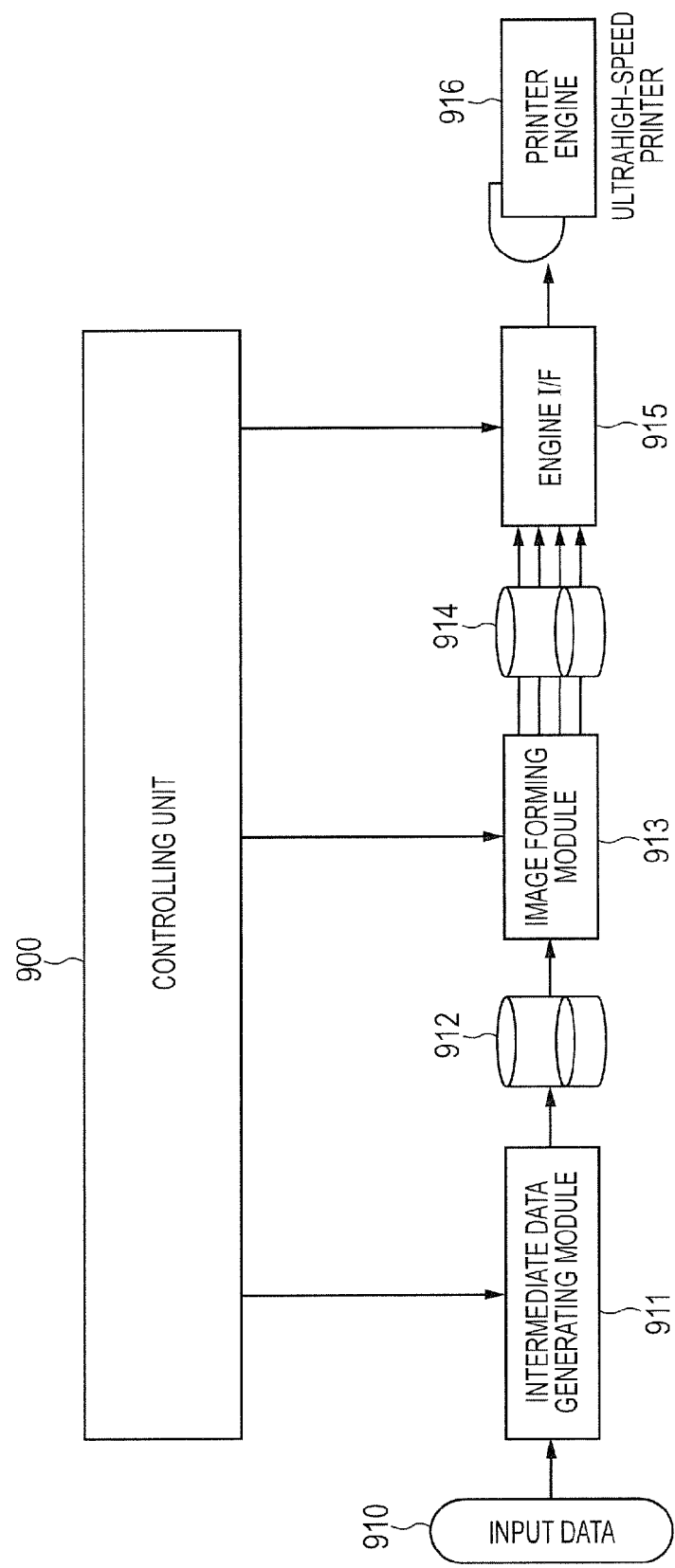
FIG. 2 is a block diagram illustrating the configuration of a conventional image processing apparatus.
Figure 3:
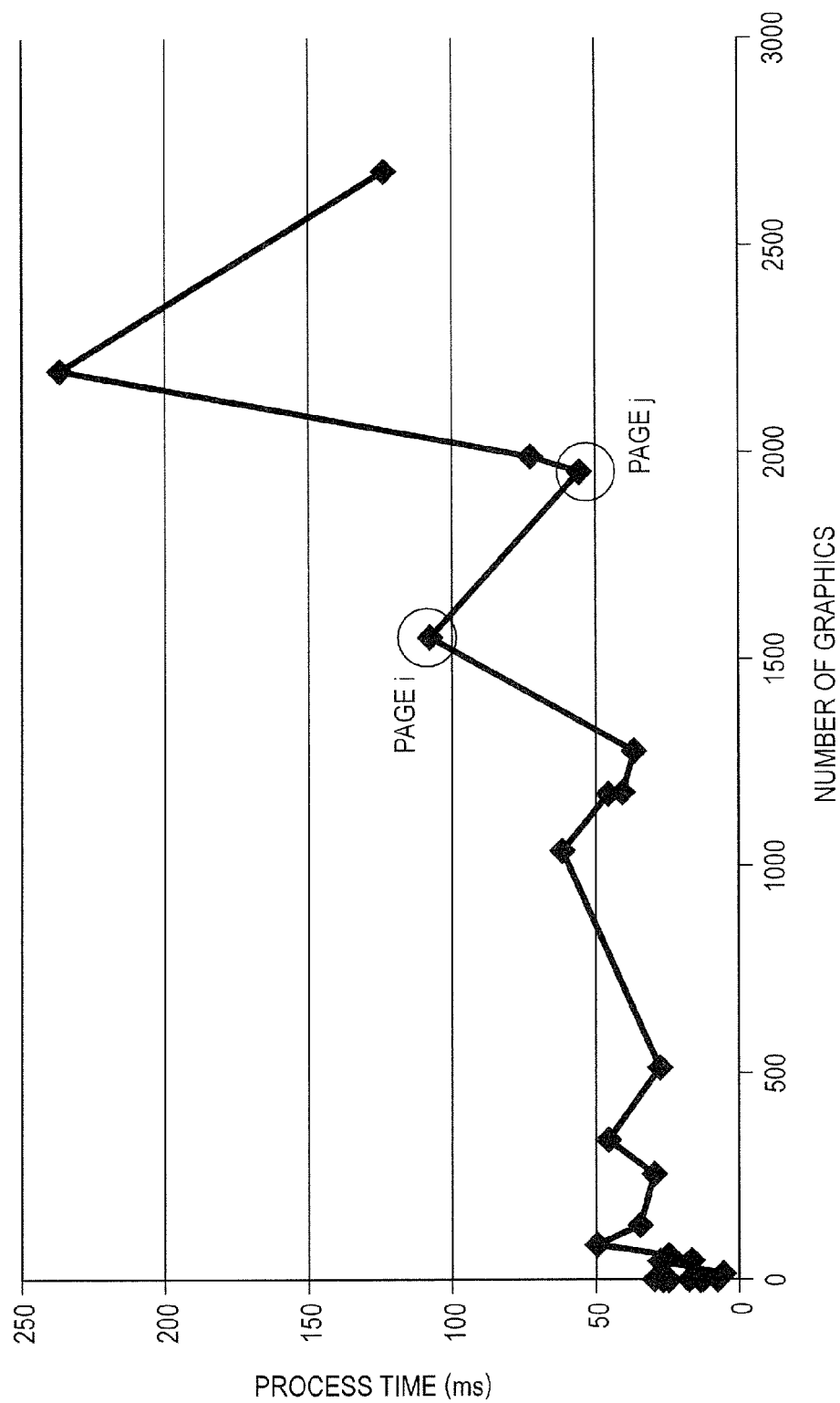
FIG. 3 is a graph indicating an example of the relation between the number of graphics and process time.
Figure 4:
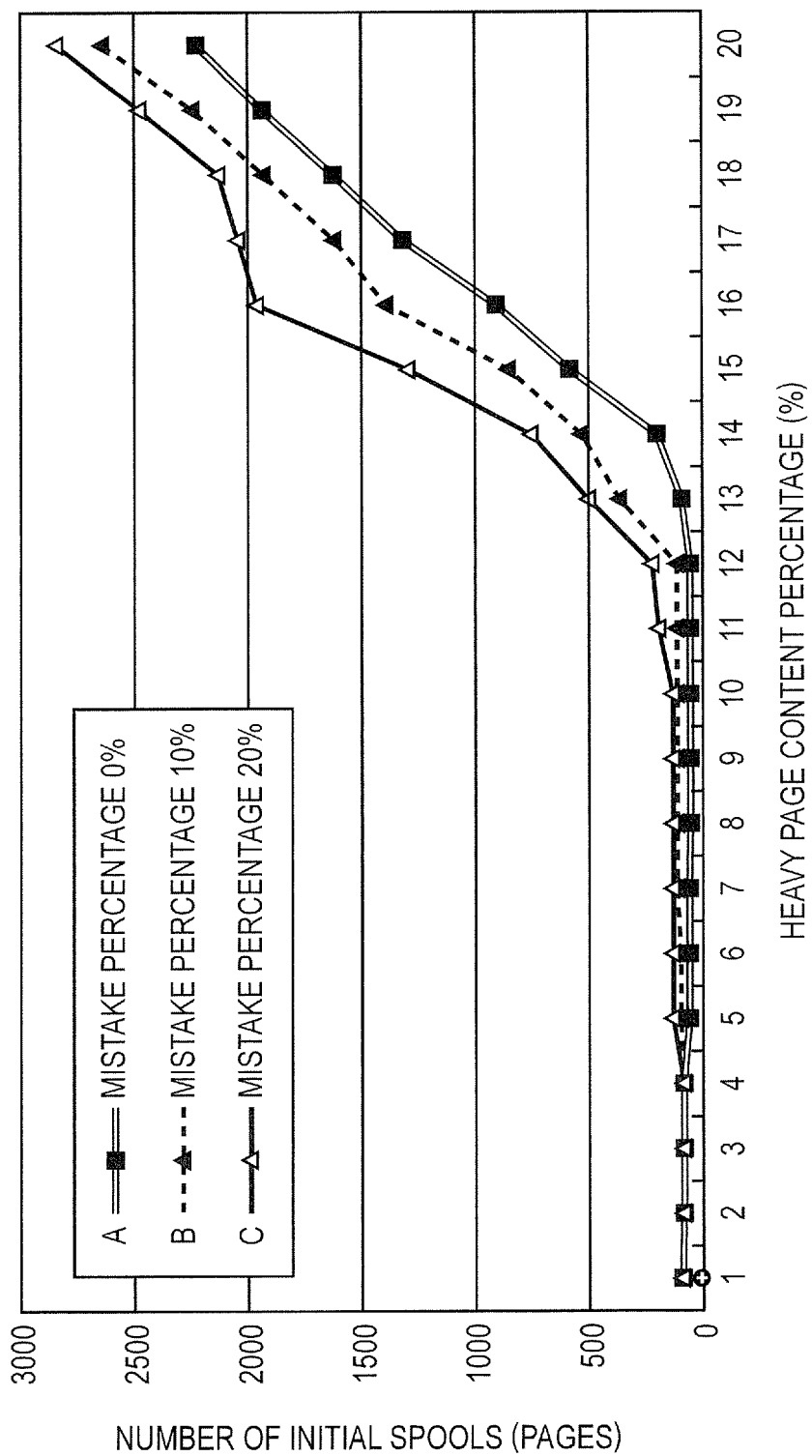
FIG. 4 is a graph illustrating the result obtained when the numbers of initial spools necessary to prevent an engine stall are inspected by the simulation.
Figure 6B:
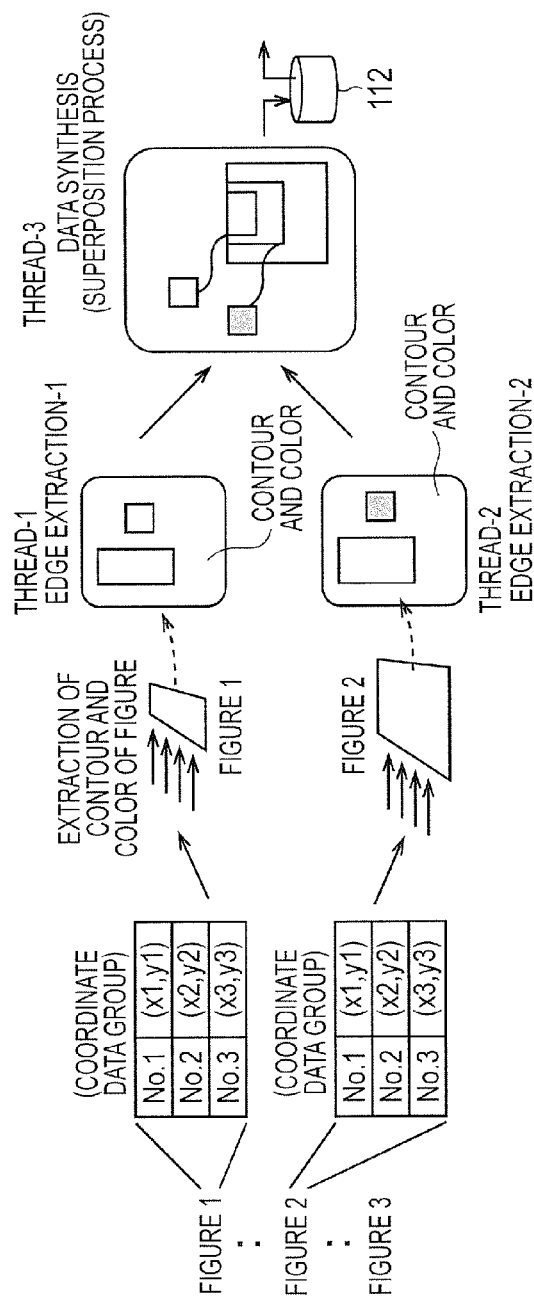
FIG. 6B is a diagram illustrating a process to be performed by the intermediate data generating module.

As illustrated in FIG. 6B, the figure data is substantially constituted by figure kind information indicating a kind of figure and the group of the coordinate data constituting the figure kind information. The edge data are extracted therefrom by the edge extraction processing units (edge extraction processing threads) 122-1 to 122-*n*. When a FIG. 1 and a FIG. 2 exist, the edge data of the two figures are simultaneously extracted because these figures are processed independently by the different threads. These processes are expressed as a thread-1 and a thread-2 in FIG. 6B. Besides, in the above processes, the coating information in the contours of the figures are simultaneously extracted by the color information extracting process. In a thread-3, the data synthesizing process is performed using the edge data and the color information extracted by the thread-1 and the thread-2. For example, when the FIG. 2 and the FIG. 1 have been coated respectively with a red simple color (opaque) and a blue simple color (opaque) and the FIG. 1 has been drawn on the FIG. 2, the upper-layer color, i.e., blue, is coated to the superposition portion of these figures. In such a state, the two pieces of color information (blue and red) are stored. On another front, in the area to be processed by the thread-3 (rectangular tiles in the example of FIG. 6B), the edge which becomes unnecessary as the result of the edge data synthesis, e.g., the superposition process, in the areas of the FIG. 1 and the FIG. 2 is erased. Incidentally, in the process like this, there is a case where the number of the pieces of color information to be held in relation to the relevant area increases depending on the superposition condition. For example, when the FIG. 1 and the FIG. 2 have been coated respectively with the red simple color (opaque) and the blue simple color (transparent) and the FIG. 2 has been drawn on the FIG. 1, the color of the superposition area is calculated by the transparent synthesizing calculation. For example, since purple is obtained if blue and red are synthesized, the red color information, the blue color information and the purple color information are held in the process of the thread-3.

By the process like this, it is possible to perform the parallel figure (including superposed figures) drawing process and adjust the process time, which were difficult by the conventional painter's algorithm. Since a so-called overwriting logic is generally applied to figure drawing on a plane, it is necessary in a painter's process to sequentially perform all the necessary processes. On the other hand, according to the first embodiment, it is possible to progressively and time-independently proceed with the process in order to appropriately proceed with the synthesizing process for each partial area, as maintaining the figure drawing order. For example, it is possible to independently perform each of the processes of generating the edge (contour) data of the figures. Moreover, it is possible to time-independently perform the superposition process for each of the areas. For example, the superposition process is the process in which, when the lower red figure is overwritten by the upper blue figure, only the blue figure is drawn in the area concerned.

Figure 7:
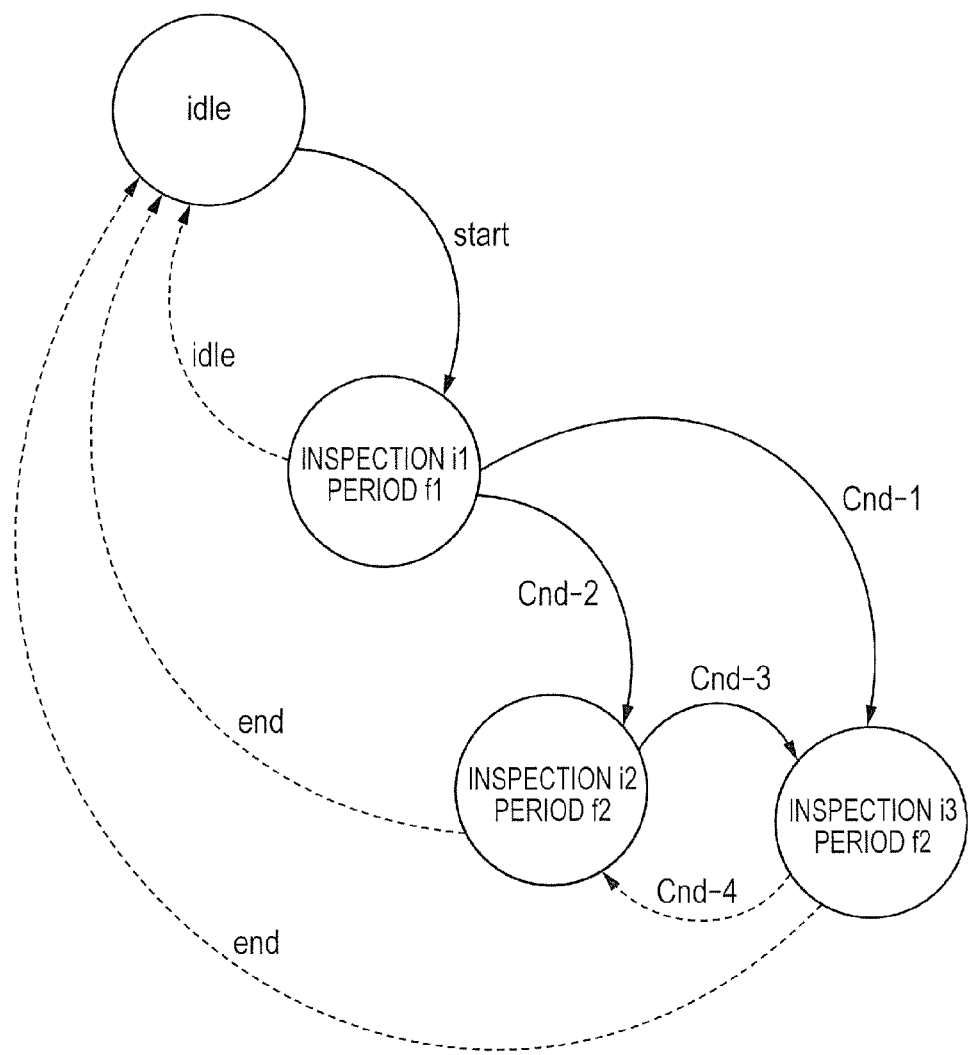
FIG. 7 is a state transition diagram illustrating state transition in the inspection process illustrated in FIG. 6B.

Subsequently, the load level detecting unit 101 will be described in detail. FIG. 7 is a state transition diagram illustrating the state transition in the inspection process of FIG. 6B. The load level detecting unit 101 detects the load of the page process in real time. Since the process by the load level detecting unit 101 is the overhead as opposed to the main process, it is necessary to always consider the time required for the relevant process. In the present embodiment, the first detection is set so as to inspect the progress of the data process (i.e., what percentage of the given data was processed) when the certain period of time (e.g., half (300 ms) of 600 ms) elapses, thereby reducing the overhead.

In FIG. 7, the state transition is started from the idle state. In the first inspection, an inspection i1 is performed in a period f1. After an appropriate time elapsed, different two standards are respectively shifted to either of different inspection processes depending on conditions. Here, it is selected to which inspection process the standard is shifted, depending on, e.g., the elapsed time from the process start. In one route, the inspection period is changed to a period f2, and an inspection i2 different from the inspection i1 is performed. In the other route, the inspection period is changed to a period f3, and an inspection i3 different from the inspection i1 is performed. These routes are constituted so as to be able to appropriately change over the inspection logic depending on, e.g., the kind of object included in the page. For example, the process contents are appropriately changed over in dependent on the differences of figure complexity, the contents of figures and the contents of images. In general, there is a problem that only the overheads increase if the inspection is performed many times when the process is being progressed. However, according to the first embodiment, the progress is not at all confirmed until the process is advanced half. Then, when the process is advanced half, discrimination as to whether the load is light or heavy is started. Here, if it is decided that the data is heavy, the more elaborate inspection is performed to finely inspect to which level the degree of heaviness corresponds.

Figure 8:
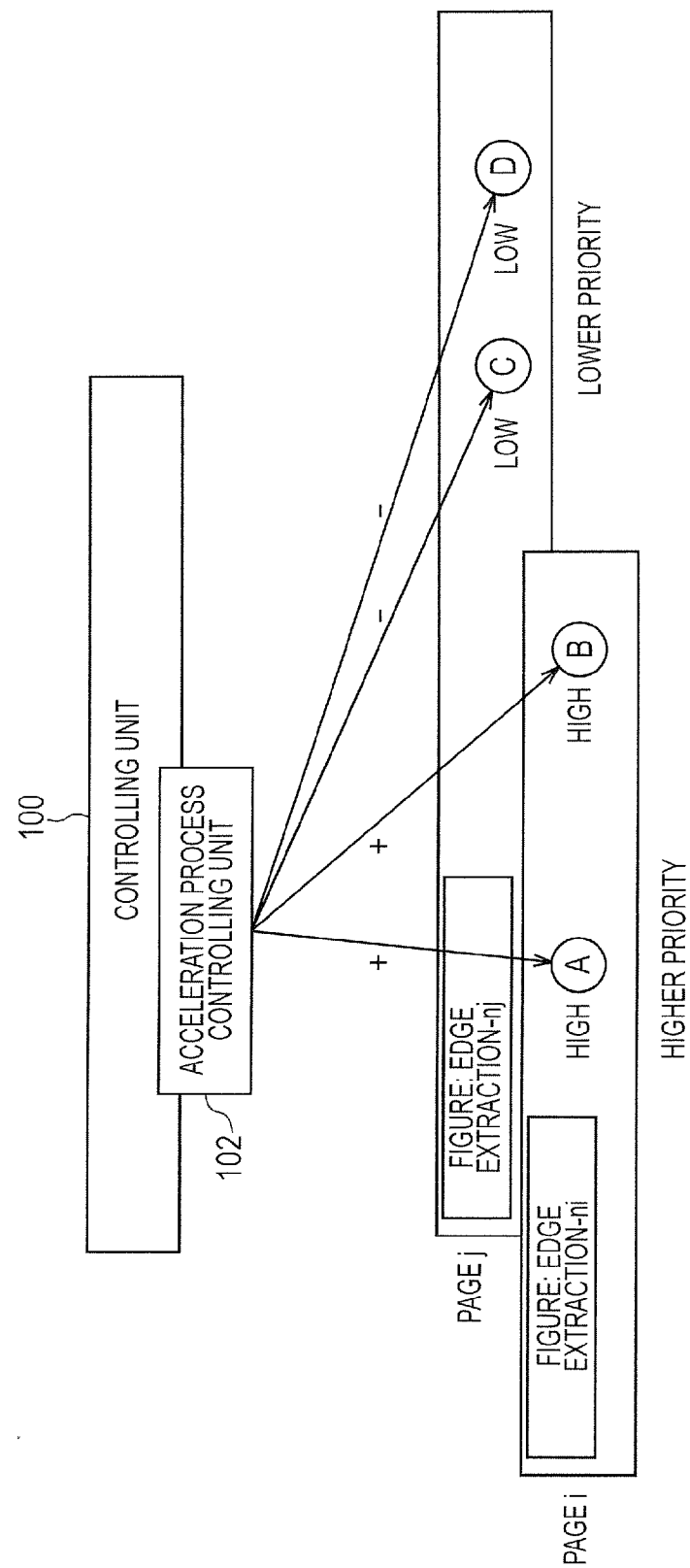
FIG. 8 is a diagram illustrating the operation of an acceleration process controlling unit 102 according to the first embodiment.

Subsequently, the acceleration process controlling unit 102 will be described in detail. FIG. 8 is a diagram illustrating the operation of the acceleration process controlling unit 102 according to the first embodiment. The acceleration process controlling unit 102 instructs to accelerate and decelerate the process speed for the process unit (a thread, a process or the like). In FIG. 8, respective process units A, B, C and D are different process units. For example, FIG. 8 shows a case where the processes for pages i and j are performed in the state that they overlap each other on the time axis. Here, on the side of the controlling unit 100, the edge extraction process for the figure is recognized as the set of the units called the threads. FIG. 8 shows the example that the process for the page i is performed in preference to the process for the page j with the objective of process speed. To achieve this operation, the acceleration process controlling unit 102 issues the instruction ("+ instruction") to raise the priority order of the thread of processing the page i so as to be higher than the priority order of the thread of processing the page j, and issues the instruction ("− instruction") to lower the priority order of the process thread for the page j. The thread priority order like this is designated by a thread priority order designating unit of the acceleration process controlling unit 102. More specifically, the thread priority order designating unit increments the attribute parameter (the attribute numeric value of the thread function) for controlling the thread when the "+ instruction" is issued, and decrements the attribute parameter numeric value for controlling the thread when the "− instruction" is issued. As a result, the schedule of the CPU core is changed. That is, the assigned CPU time is changed per unit of thread. As just described, the thread priority order designating unit designates the priority order of the thread.

Figure 9:
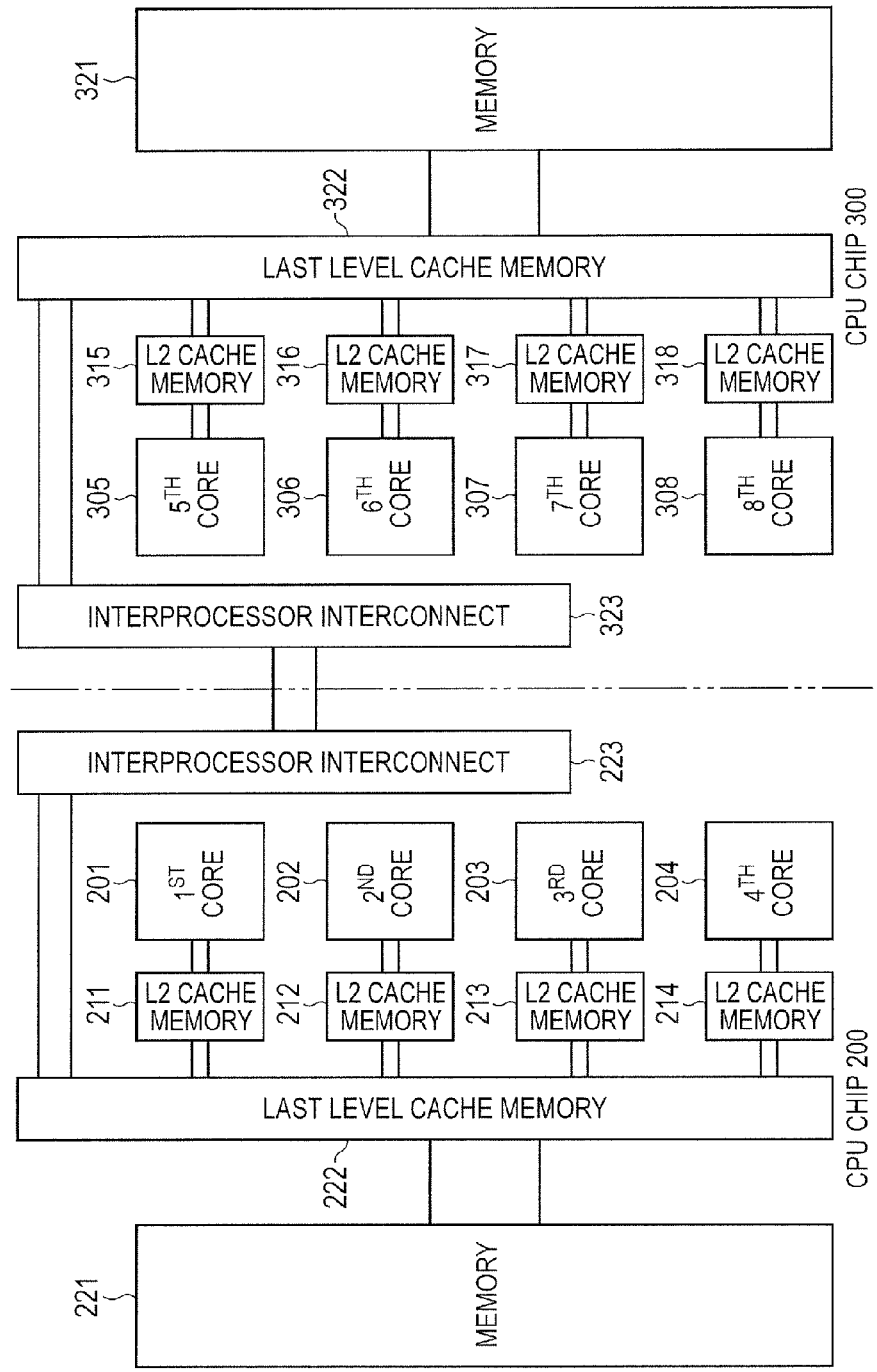
FIG. 9 is a block diagram illustrating the hardware constitution of the image processing apparatus according to the first embodiment.

The function constitution illustrated in FIG. 5 can be achieved by, e.g., a hardware constitution illustrated in FIG. 9. More specifically, the program for achieving the above function constitution can be executed by a computer having the hardware constitution illustrated in FIG. 9. Namely, FIG. 9 is the block diagram illustrating the hardware constitution of the image processing apparatus according to the first embodiment. In the image processing apparatus according to the first embodiment, two CPU sockets are prepared on one board, and CPU chips 200 and 300 are respectively mounted thereon. The CPU chip 200 includes a first core 201, a second core 202, a third core 203, a fourth core 204, four L2 cache memories 211 to 214 respectively corresponding to these cores, a last level cache memory 222, a memory 221, and an interprocessor interconnect 223 connected to the last level cache memory 222. Likewise, the CPU chip 300 includes a fifth core 305, a sixth core 306, a seventh core 307, an eighth core 308, four L2 cache memories 315 to 318 respectively corresponding to these cores, a last level cache memory 322, a memory 321, and an interprocessor interconnect 323 connected to the last level cache memory 322. The interprocessor interconnects 223 and 323, which are mutually coupled to each other, together constitute a high-speed connection line.

The entire address spaces of the memories 221 and 321 are divided into two, the upper-side address space is assigned to the memory 221 of the CPU chip 200, and the lower-side address space is assigned to the memory 321 of the CPU chip 300. The CPU chips 200 and 300 can appropriately access all the address spaces via the respective last level cache memories 222 and 322. As illustrated in FIG. 9, since the four cores are provided for each of the CPU chips 200 and 300, the eight cores can be used on the one board in the present embodiment.

Figure 10:
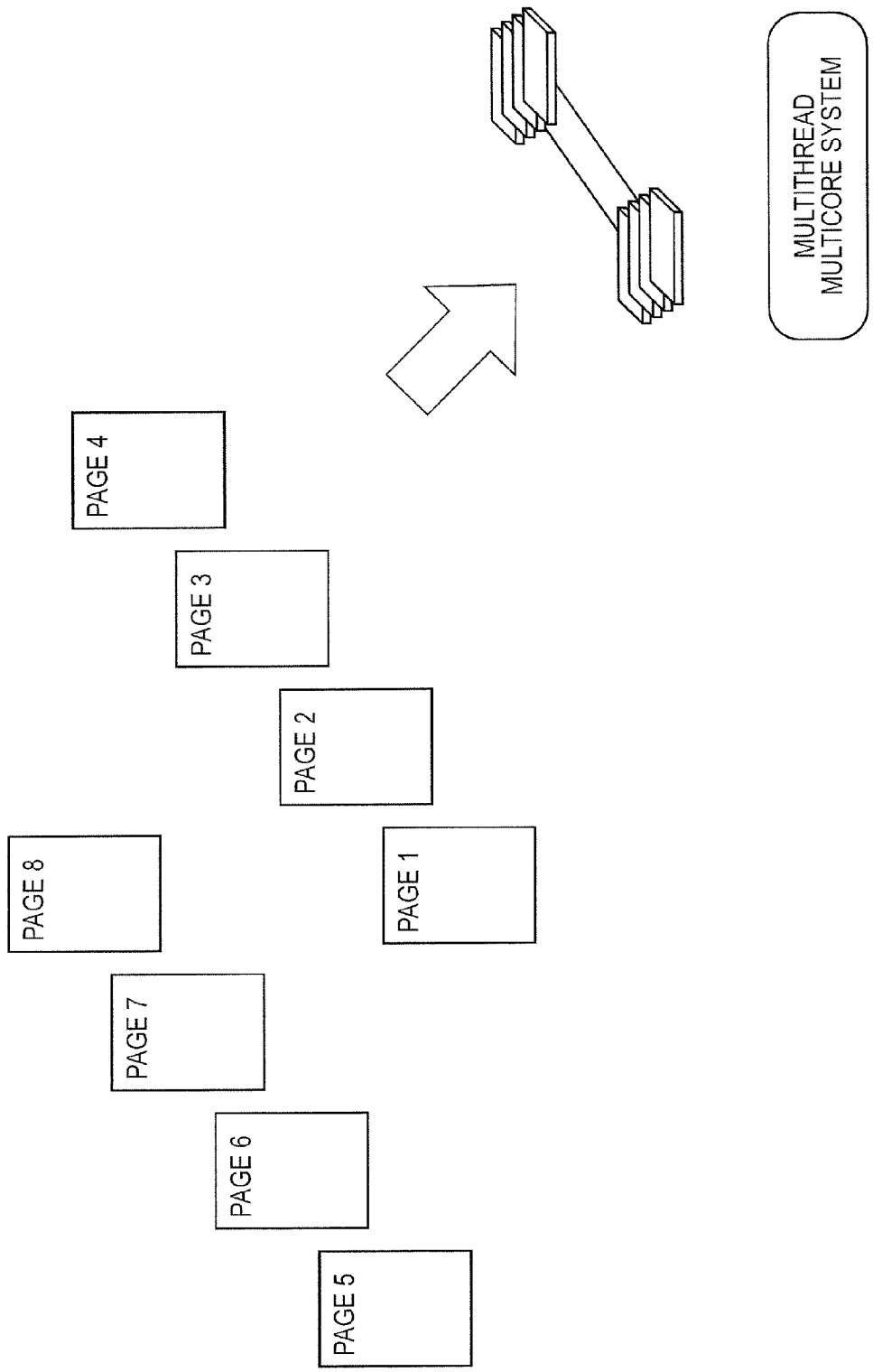
FIG. 10 is a diagram illustrating a page process schedule in the first embodiment.

Subsequently, a page process schedule in the first embodiment will be described. FIG. 10 is a diagram illustrating the page process schedule in the first embodiment. In the first embodiment, as just described, the multi-core CPU is used, and the multi-thread process is applied to the page process as the normal operation in the print (rendering) process. Thus, the process of the next page is started even if the process of the previous page is not completed yet. For example, as illustrated in FIG. 10, the processes in a page group (including four pages 1 to 4) are started at a time. Then, after a certain period of time elapsed from the process start, the processes in a next page group (including four pages 5 to 8) are started irrespective of whether or not the processes of the previous page group have been completed. Incidentally, since the processes for the pages 1 to 4 are performed in parallel, the CPU chip 200 performs the simultaneous parallel processes during the period of time that the pages processes overlap.

As a result, even in the case where the four processes are performed in parallel, since the respective process times are the same as the process time in the single-core process, the entire process is completed early to the extent that the four processes are performed simultaneously. Incidentally, when the single-core CPU is used, the relevant CPU merely performs the simulative parallel processes by the time-division process. Namely, the process capability of the relevant CPU is not improved. Thus, even if the four processes are performed simultaneously, the entire process is not accelerated.

Figure 11:
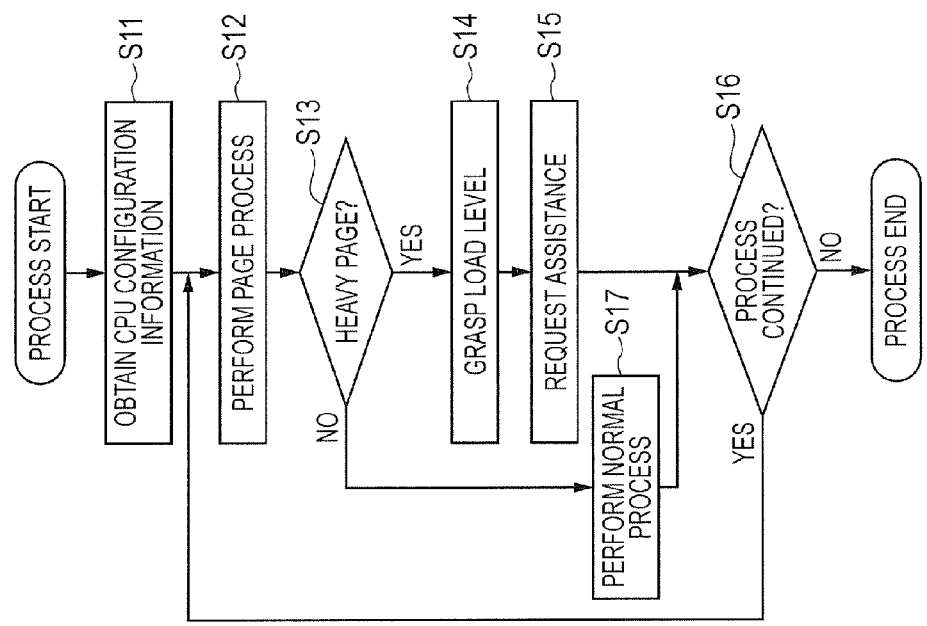
FIG. 11A is a flow chart indicating a core assignment process in the first embodiment.
FIG. 11B is a diagram illustrating an example of CPU (central processing unit) configuration information.

Next, a core assignment process in the first embodiment will be described. FIG. 11A is a flow chart indicating the core assignment process in the first embodiment, and FIG. 11B is a diagram illustrating an example of the CPU configuration information.

In the first embodiment, as illustrated in FIG. 11A, the CPU configuration information is obtained at the start of the procedure (S11). As illustrated in FIG. 11B, for example, the CPU configuration information is the table (table data) by which it is decided whether, in regard to a process core (start point side), another core is the core on the same socket or the core on a different socket. Namely, the CPU configuration information indicates the connection relations of the plurality of cores. If the first core 201 is assumed as the start point, it is turned out from the CPU configuration information (table data) that the second core 202, the third core 203 and the fourth core 204 exist on the socket same as that on which the first core 201 exists. Also, it is turned out that the fifth core 305, the sixth core 306, the seventh core 307 and the eighth core 308 exist on another socket. In general, since the last level cache memory is commonly used by the cores on the same socket, it is possible to exchange the data comparatively without the overhead. On the other hand, it is necessary to exchange the data in regard to the core on another socket via the interprocessor interconnects, a certain degree of overhead occurs.

After the CPU configuration information was obtained, the process (page process) is performed to the page to be printed (S12). Next, the load level detecting unit 101 detects whether or not the page to be processed at that point is a heavy page, that is, whether or not the load level of the relevant page is higher than a threshold (S13). If it is not detected that the relevant page is the heavy page, the relevant page is considered as a normal page, and a normal process is performed (S17). On the other hand, if it is detected that the relevant page is the heavy page, the load level thereof is grasped (S14). As described above, the load level is detected by the load level detecting unit 101. After then, an assistance request is performed to another core depending on the load level (S15). For example, if the load level is 2, the assistance request is performed to the core on the socket same as that of the start-point core to which the process is performed. Besides, if the load level is 3, the assistance request is performed also to the core on the socket different from the socket of the start-point core. Here, it should be noted that the assistance request is a request of accommodation of CPU time. Then, it is decided whether or not another page to be processed exists, that is, whether or not to continue the process (S16). If it is decided that another page to be processed exists, the process is returned to S12. On the other hand, if it is decided that another page to be processed does not exist, the process is ended.

Figure 12:
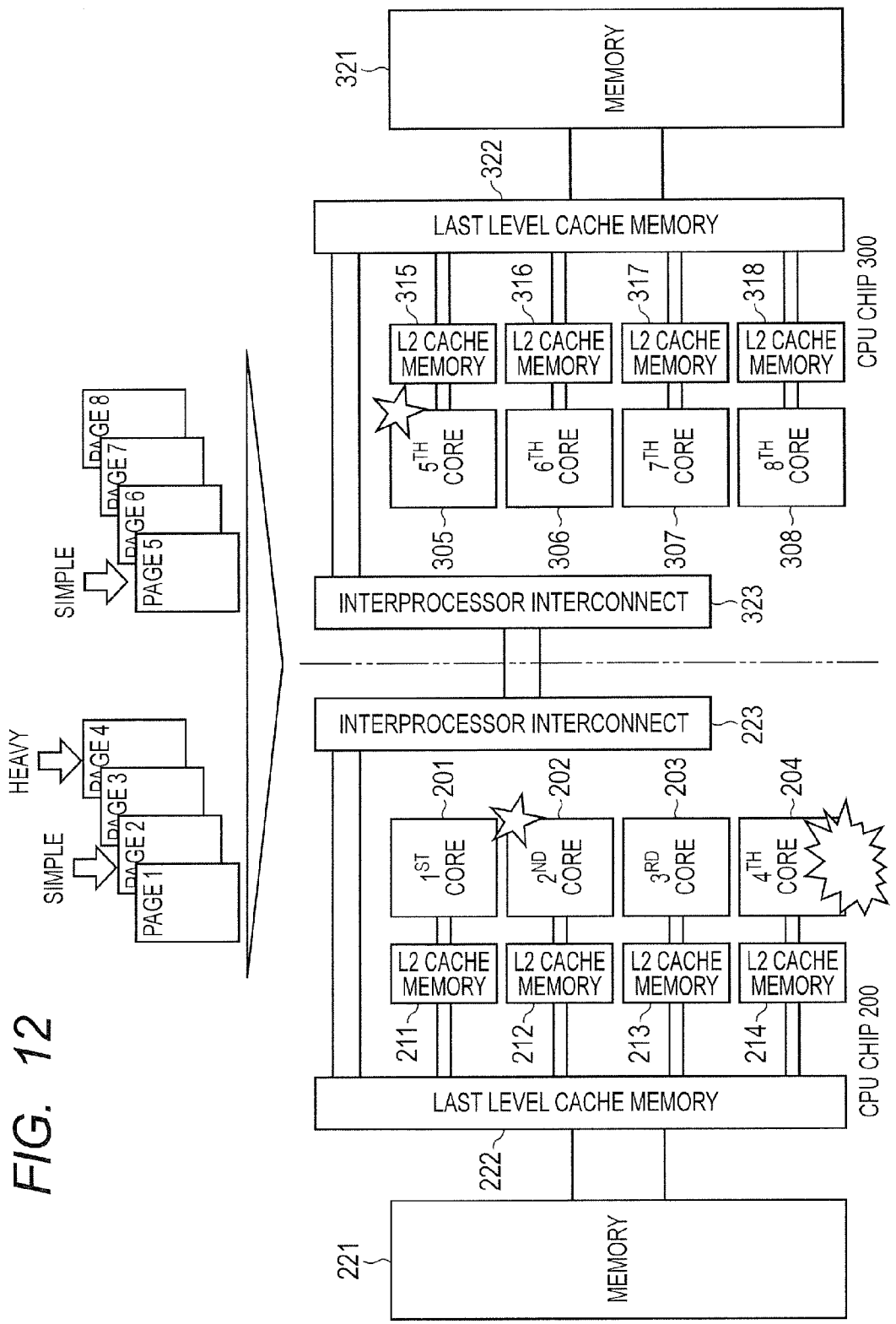
FIG. 12 is a block diagram illustrating a concrete example obtained by applying the process indicated in FIG. 11A.

Next, the concrete example to which the process in the flow chart of FIG. 11A is applied will be described. When the process to the figures is performed in the first embodiment, the processes in the pages are performed in parallel by the configuration of FIG. 6A for achieving the high-speed process. However, there is a case where suchlike parallel processes are not sufficient to complete the process within a previously supposed prescript time, depending on the load level. Therefore, in the first embodiment, the core is assigned depending on the load level. That is, as illustrated in FIG. 8, the acceleration process controlling unit 102 issues the instruction to raise the priority order of the thread of processing the heavy page. However, the CPU time in another thread is deprived only by, for example, raising the priority order of the thread of processing the heavy page. Therefore, in the first embodiment, the controlling unit 100 grasps the page for which any problem does not occur even if the CPU time is deprived, and the core of processing the relevant page. In a concrete example illustrated in FIG. 12, it is assumed that the page 4 is the page (heavy page) for which the process load is heavy and the fourth core 204 processes this page. Moreover, it is assumed that the controlling unit 100 grasps the pages 2 and 5 as the pages for which any problem does not occur even if the CPU time is deprived and further grasps the second core 202 and the fifth core 305 respectively processing the these pages. In the case like this, according to the process in the flow chart of FIG. 11A, if the fourth core 204 is considered as the start point, the core on the same socket is the second core 202, and the core on the different (another) socket is the fifth core 305. Consequently, the assistance request is performed to the second core 202 if the load level is 2, and the assistance request is performed to both the second core 202 and the fifth core 305 if the load level is 3. Namely, the accommodation of the CPU time is requested to the second core 202 and the fifth core 305 depending on the load level.

Thus, since the assistance request is performed to the core on the same socket in the process for the heavy page for which the load is relatively small, it is possible to effectively perform the process. On the other hand, since the assistance request is performed additionally to the core on the different (another) socket, it is possible to further reduce the load of the start-point core.

Second Embodiment

Subsequently, the second embodiment will be described. In the second embodiment, the constitution of the CPU chip is different from that in the first embodiment, and thus the core assigning process is different from that in the first embodiment. Other constitutions and configurations in the present embodiment are the same as those in the first embodiment. FIG. 13A is a block diagram illustrating the constitution of the CPU chip to be used in an image processing apparatus according to the second embodiment.

Here, a CPU chip 400 includes a first core 401, a second core 402, two L2 cache memories 411 and 412 respectively corresponding to the above cores, a last level cache memory 422, a memory 421, and an interprocessor interconnect 423 connected to the last level cache memory 422. Namely, the CPU chip 400 serves as the dual-core processor having two cores. In case of constituting the eight-core image processing apparatus by using the dual-core CPU chip like this, the four CPU chips 400 are necessary. To connect the CPU chips, there are various connection formats including, e.g., a connection format illustrated in FIG. 13B or 13C.

Figure 13B:
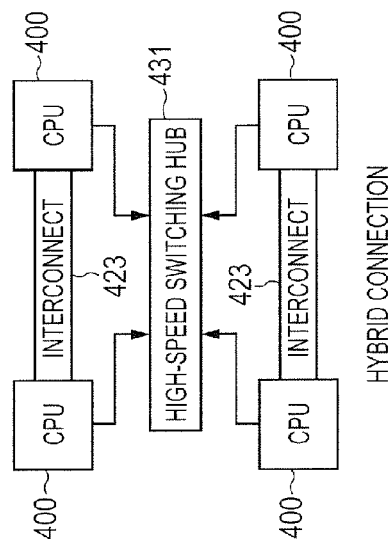
FIG. 13B is a diagram illustrating an example of the connection format of the CPU chip.

In the example illustrated in FIG. 13B, the two boards each of which has the two CPU sockets thereon are used, and the relevant two boards are mutually connected to each other via a high-speed switching hub 431. In each of the boards, the two CPU chips are mutually connected to each other via an interprocessor interconnect 423.

Figure 13D:
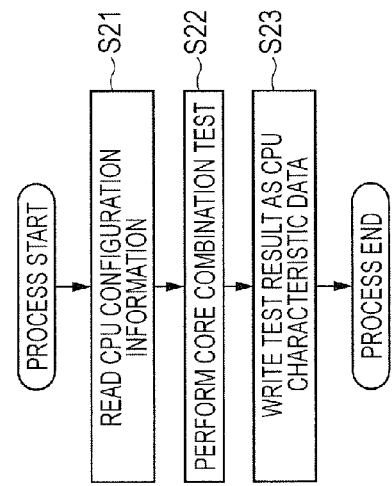
FIG. 13D is a flow chart indicating the process to be performed in a core combination test.
Figure 13A:
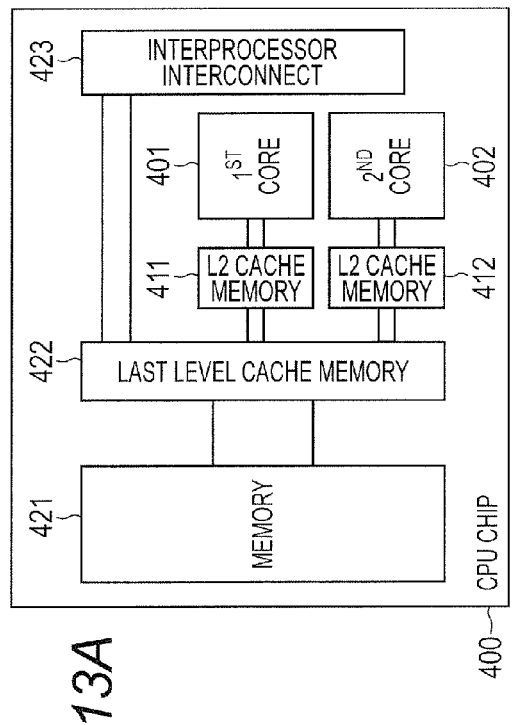
FIG. 13A is a block diagram illustrating the constitution of a CPU chip used in an image processing apparatus according to the second embodiment.
Figure 13C:
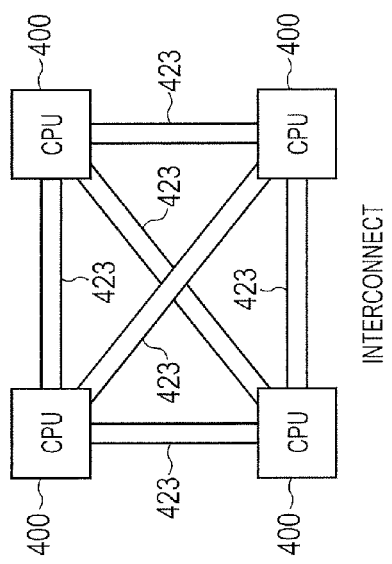
FIG. 13C is a block diagram illustrating an example of the connection format of the CPU chip.

In the example illustrated in FIG. 13C, the one board which has the four CPU sockets thereon. In the board, the one CPU chip is connected to the other three CPU chips via the interprocessor interconnects 423.

In both the examples, the whole address space of the memory 421 of each of the CPU chips 400 is properly divided and assigned. Thus, each CPU chip 400 can properly access all the address spaces via each last level cache memory 422.

Unlike the first embodiment, it is not easy in the second embodiment to statically and accurately grasp the CPU configuration information. Therefore, in the second embodiment, a core combination test is performed within the image processing apparatus, and thus the CPU characteristic data is updated. FIG. 13D is a flow chart indicating the process of the core combination test.

First, the CPU configuration information is read (S21). Then, the core combination test is performed (S22). For example, in the state that causes an arbitrary core to perform the process for which the load is heavy, it causes the other seven cores to perform the assistance requests respectively, and the rate of request speeds are relatively measured. After then, the test result is written and recorded as the CPU characteristic data (S23).

By appropriately profiling the characteristic, it is possible to adjust the core assignment so as to be able to obtain the excellent performance even if the constitution of the image processing apparatus changes.

Figures 14A, 14B:
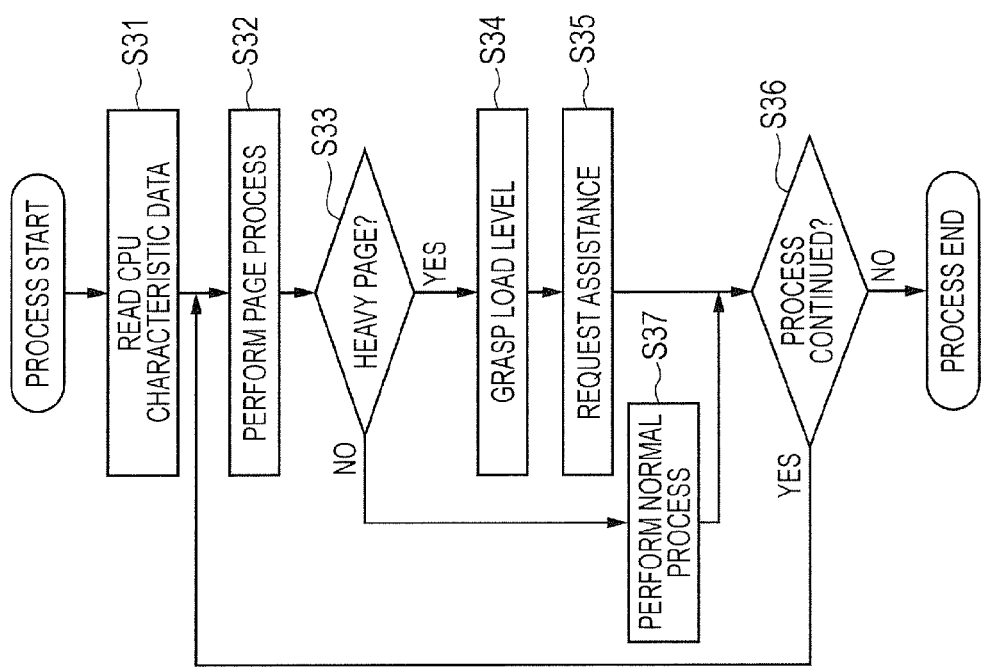
FIG. 14A is a flow chart indicating a core assignment process in the second embodiment.
FIG. 14B is a diagram illustrating an example of CPU characteristic data.

FIG. 14A is a flow chart indicating the core assignment process in the second embodiment, and FIG. 14B is a diagram illustrating an example of the CPU characteristic data.

In the second embodiment, as illustrated in FIG. 14A, the CPU characteristic data is read at the start of the procedure (S31). As illustrated in FIG. 14B, for example, the CPU characteristic data is the table (table data) which indicates the relative relation of the process speed in the case where the assistance is requested for the other core in regard to the process core (start point side), and indicates the relative relation of the process speeds among the plurality of cores. In general, when the data is exchanged via the interprocessor interconnect or the like, the overhead or the like occurs, so that the process speed decreases even if the relevant process is the process of a kind. The CPU characteristic data indicates the relative index of degrees of such speed decreases. The speed levels are classified into levels 1 to 3, and the CPU characteristic data is created from the result of the test in the flow chart of FIG. 13D.

After the CPU characteristic data was obtained, the page process for the page to be printed is performed (S32). Next, the load level detecting unit 101 detects whether or not the page to be processed at that point is a heavy page, that is, whether or not the load level of the relevant page is higher than a threshold (S33). If the heavy page is not detected, the relevant page is considered as a normal page, and a normal process is performed (S37). On the other hand, if the heavy page is detected, the load level is grasped (S34). As described above, the load level is detected by the load level detecting unit 101. After then, the assistance request is performed to the other core depending on the load level (S35). Then, it is decided whether or not another page to be processed exists, that is, whether or not to continue the process (S36). If it is decided that another page to be processed exists, the process is returned to S32. On the other hand, if it is decided that another page to be processed does not exist, the process is ended.

Figure 15:
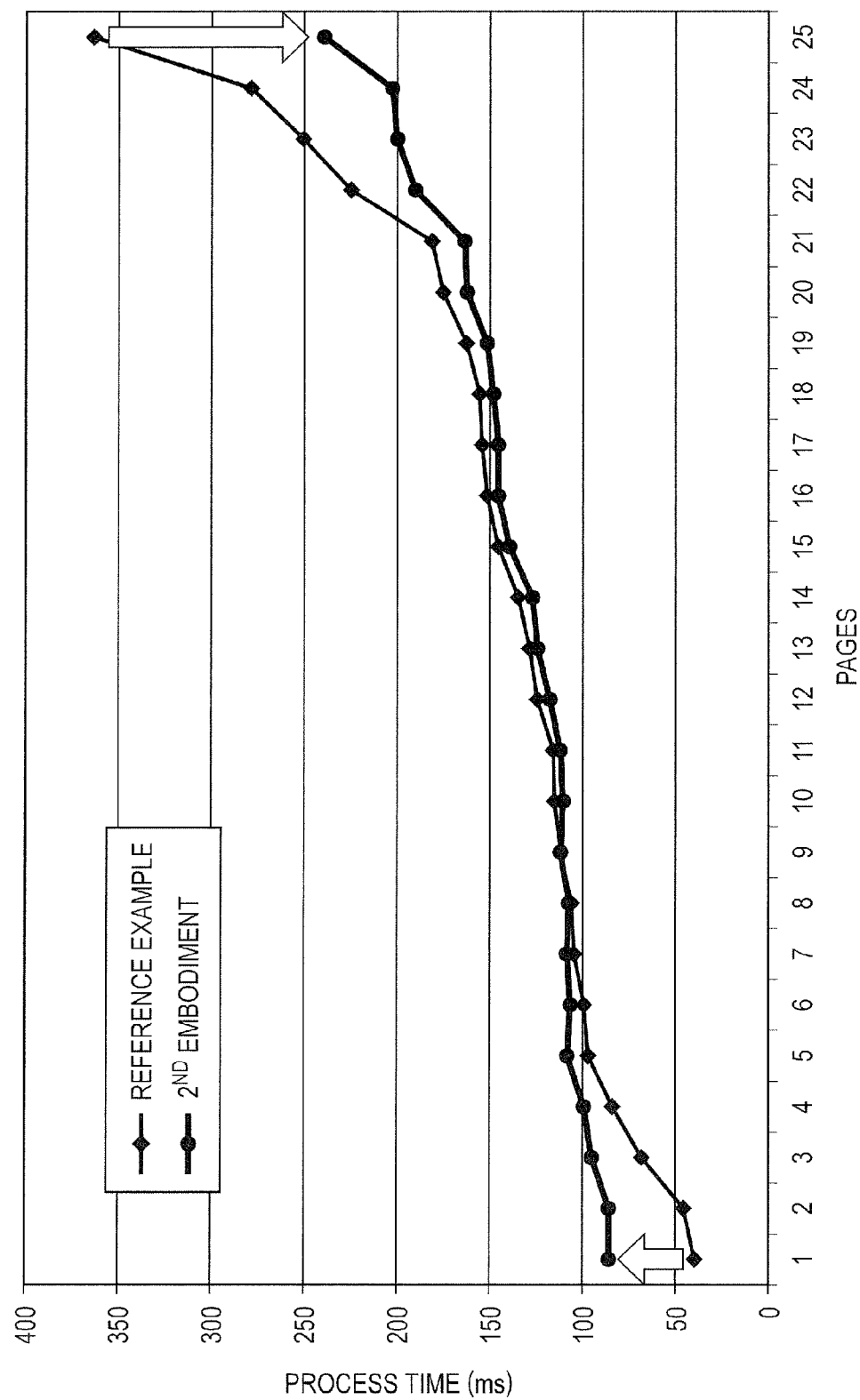
FIG. 15 is a graph for describing an effect of the second embodiment.

FIG. 15 is a graph for describing the effect of the second embodiment. In FIG. 15, the vertical axis shows the process time of each of the 25 pages, and the horizontal axis shows the page numbers. Here, the process time becomes long in proportion to the increase of the page number. As compared with the reference example, the larger the process load, the shorter the process time in the second embodiment shown in FIG. 15. On the other hand, the smaller the process load, the longer the process time. As a result, variations of process times are suppressed, and such an effect implies that the intermediate data can be generated at stable speed. Incidentally, the reference example corresponds to the effect obtained by the conventional image processing apparatus illustrated in FIG. 2.

Third Embodiment

Figure 16:
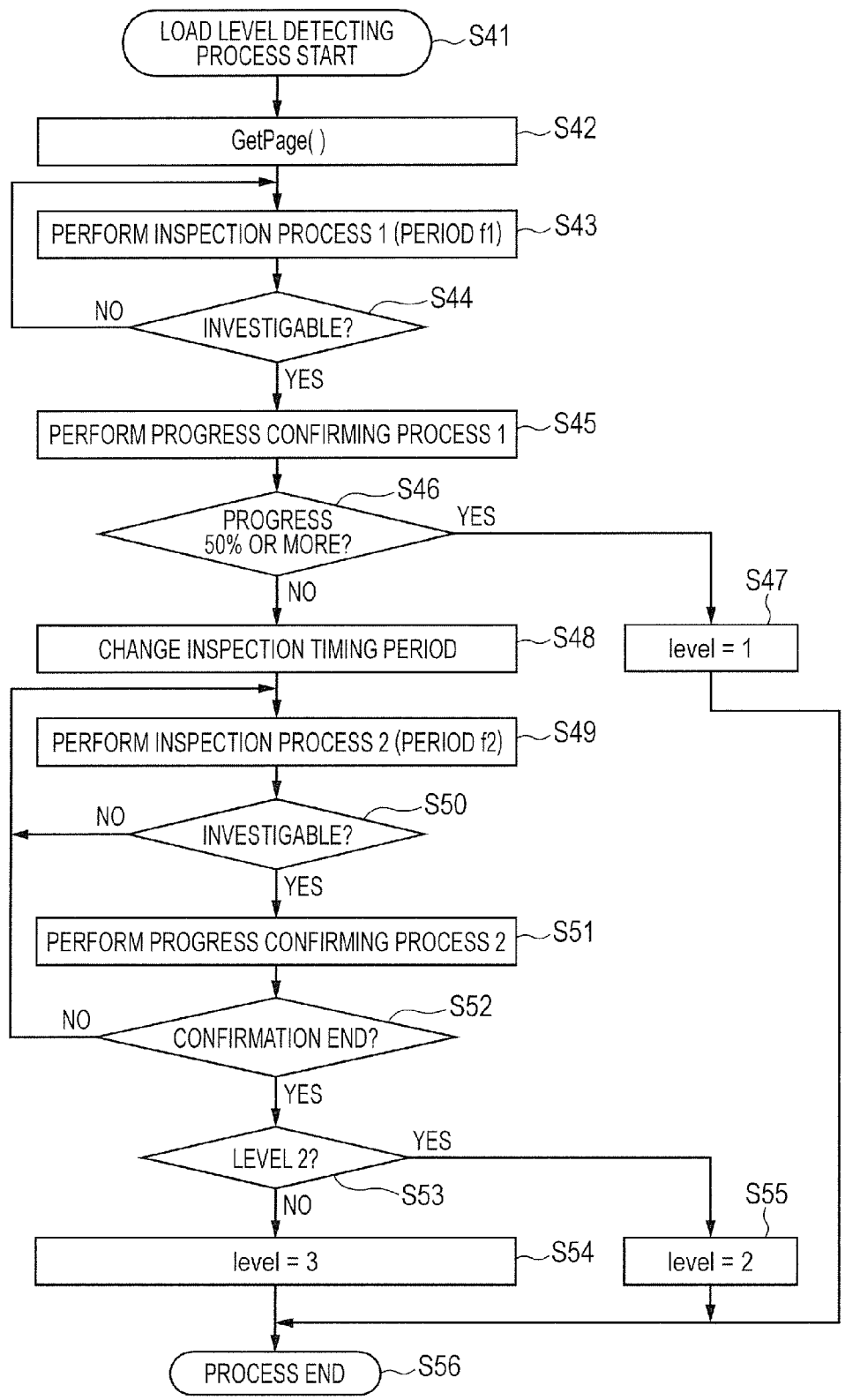
FIG. 16 is a flow chart indicating the operation of a load level detecting unit in the third embodiment.

Subsequently, the third embodiment will be described. In the third embodiment, the operation of the load level detecting unit 101 is different from that in the first embodiment. Namely, the constitution and the operation of the image processing apparatus other than the above operation are the same as those in the first embodiment. FIG. 16 is a flow chart indicating the operation of the load level detecting unit 101.

When the load level detecting process is started (S41), the property information of the page to be processed is accessed by the GetPage( ) function (S42). Thus, an inspection can be started to the page to be processed. Then, the inspection process is performed as an inspection process 1 in the cycle defined by a period f1 (S43). Simply, it is investigated and decided whether or not to be able to advance the process to S45 in the cycle (timing) of the period f1. Such decision is set to the flag, and branching decision is performed (S44). The processes in S43 and S44 are the loop which continues until the given condition is satisfied, so that the overhead in the process loop concerned is minimized.

If the decision can advance to S45, that is, if "investigable" is decided, the progress rate of the page process is confirmed as a progress confirming process 1 (S45). Here, since the load level of the level 3 has been defined, it is confirmed at the point when 300 ms elapses whether or not the page data process of 50% or more has been completed, and then the branching decision is performed (S46).

If the progress of 50% or more is confirmed, "1" is substituted for a variable "level" (S47), and the process is advanced to an end process in S56. On the other hand, if the progress is less than 50%, the inspection timing period is changed (S48). In this case, that is, in the case where the progress is less than 50%, it has been confirmed that the process of the relevant page is heavy and the assistance (increment of the thread priority order) is requested based on the more accurate information. For this reason, because of the reason that there is no problem even if the overhead increases to some extent, the inspection procedure such as inspection timing or the like is changed. That is, it is set to frequently and accurately perform the inspection as compared with the inspection in S43. Next, the inspection process is performed as an inspection process 2 in the cycle defined by a period f2 (S49). Simply, it is investigated and decided whether or not to be able to advance the process to S51 in the cycle (timing) of the period f2. Such decision is set to the flag, and branching decision is performed (S50). The processes of S49 and S50 are the loop which continues until the given condition is satisfied. It should be noted that there is no problem even if the overhead in the process loop concerned is larger than the overhead in the process loop of S43 and S44.

If the decision can advance to S51, that is, if "investigable" is decided, the progress rate of the page process is confirmed as a progress confirming process 2 (S51). Based on the premise that the progress of the process is in proportion to time, for example, it is expected that the progress is 50% when 300 ms elapses, and it is expected that progress is 55% when 330 ms elapses. Subsequently, 60% is the progress to be essentially expected when 360 ms elapses. In S51, the delay from the expected degree of progress is calculated. More specifically, the progress delay rate (achievement value/target value) is simply calculated. Then, it is decided whether or not the inspection performed is sufficient to decide that the load level is either the level 2 or the level 3 (S52). If it is decided that the inspection is not sufficient, the process is returned to S49.

On the other hand, if it is decided that the inspection is sufficient, it is further decided whether or not the load level is the level 2 (S53). If it is decided that the load level is not the level 2, that is, the load level is the level 3, "3" is substituted for the variable "level" (S54), and the process is advanced to the end process in S56. On the other hand, if it is decided that the load level is the level 2, "2" is substituted for the variable "level" (S55), and the process is advanced to the end process in S56.

Figure 17:
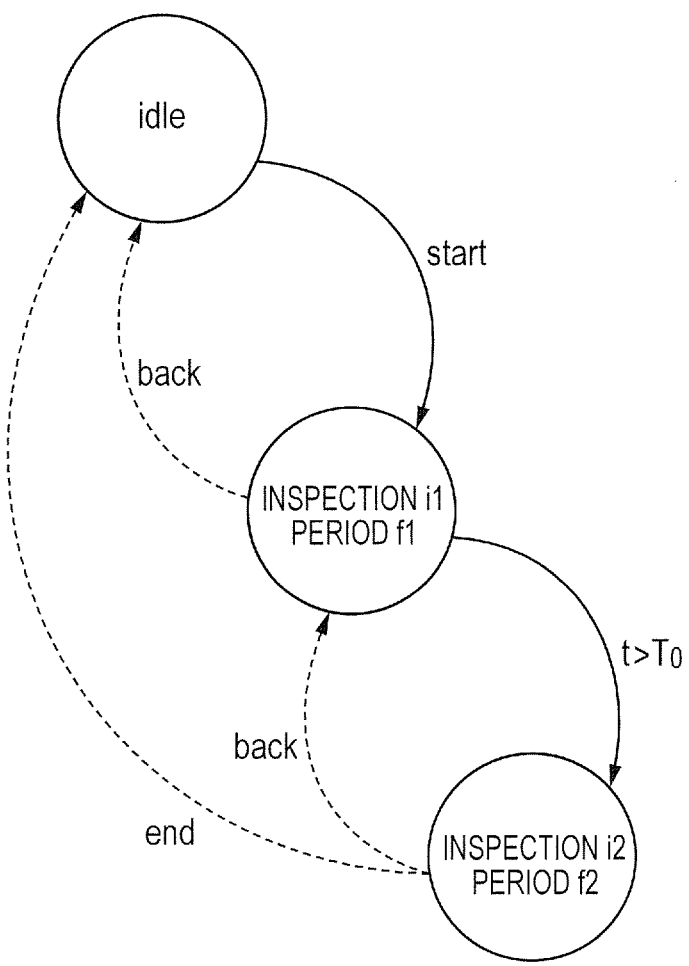
FIG. 17 is a state transition diagram illustrating state transition in the inspection process illustrated in FIG. 16.

FIG. 17 is a state transition diagram illustrating state transition in the inspection process illustrated in FIG. 16. The state transition is started from the idle state. In the first inspection, an inspection i1 is performed at the period f1. After an appropriate time elapsed, the inspection period is changed to f2, and an inspection i2 different from the inspection i1 is performed. In general, there is a problem that the overheads increase if the inspection is performed many times during the progress of the process, so that the entire performance is influenced adversely. However, according to the third embodiment, since the progress is not at all confirmed until the process is advanced half, it is possible to effectively suppress the time loss due to the overhead.

On another front, when the process is advanced half, the macroscopic discrimination as to whether the load is light or heavy is performed. Then, if it is decided that the data is heavy, the accurate inspection is performed by the procedure in S49 and the subsequent steps of FIG. 16 to decide whether the load level is the level 2 or the level 3.

Subsequently, a page process schedule in the third embodiment will be described based on the comparison with that of a general image processing apparatus. FIG. 18A is a diagram illustrating the page process schedule of the general image processing apparatus, and FIG. 18B is a diagram illustrating the page process schedule of the image processing apparatus according to the third embodiment.

In the general image processing apparatus, the rendering process of each page is started after the rendering process of the previous page was ended. On the other hand, in the third embodiment, the multi-core CPU is used as well as the first embodiment, and the multi-thread process is applied to the page process as the normal operation in the print (rendering) process. Further, in the page process schedule, the process of the next page is started even if the process of the previous page is not completed yet. In the example illustrated in FIG. 18B, the process of a page 3 is started before the process of a page 2 is completed, and the process of a page 4 is started before the process of the page 3 is completed. In this case, the CPU performs the parallel processes simultaneously during the period of time that the processes of the two pages overlap. As a result, even in the case where the two processes are performed in parallel, each process time is the same as the process time in a case where the corresponding process is performed by a single-core CPU. Thus, the entire process is completed early to the extent that the processes are performed simultaneously. Incidentally, when the single-core CPU is used, the relevant CPU merely performs the simulative parallel processes by a time-division process. Namely, the process capability of the single-core CPU is not improved any more. For this reason, even if the two processes are performed simultaneously by the single-core CPU, the entire process is not accelerated. The process timing in each of FIGS. 18A and 18B is certainly defined based on the design speed (PPM) of a printer engine, or the like. For example, if the printer engine of 100 PPM is used, the base time for each page is 600 ms. Alternatively, even if it is possible to designate the speed depending on the condition or the like of the intermediate data spooler 112, the page process is always started constantly in a certain period of time.

Figure 19:
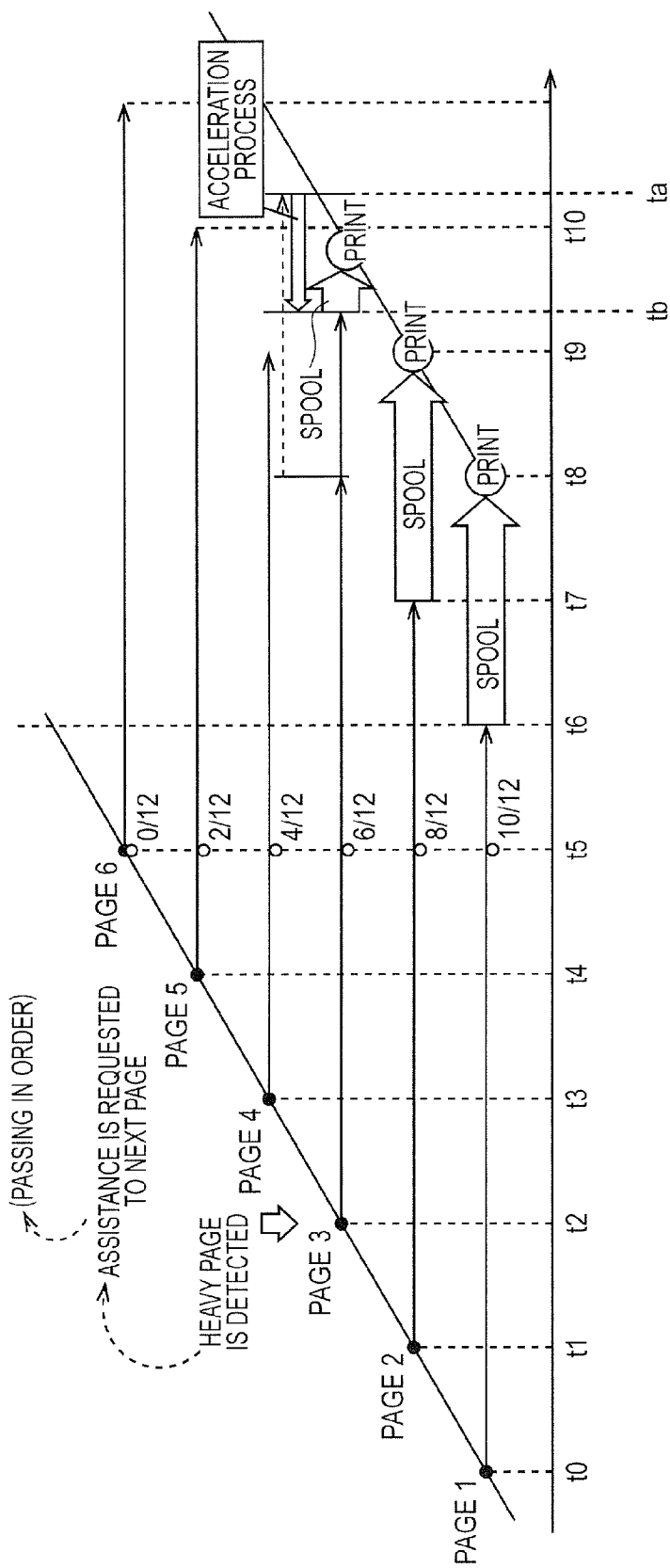
FIG. 19 is a diagram illustrating an example of the operation of the image processing apparatus according to the third embodiment.

Next, the operation of the image processing apparatus to be performed when the heavy page for which the process load is high or heavy is included in the plurality of pages to be processed will be described. FIG. 19 is a diagram illustrating an example of the operation of the image processing apparatus according to the third embodiment.

Here, it is assumed that the printing processes are performed continuously to six pages of pages 1 to 6, and the printing process for each page is started at a certain interval. More specifically, it takes time from a time t0 to a time t6 to perform the process (rendering) to the page 1, and the output data of this process is output to the intermediate data spooler 112. The spooled data is held by the intermediate data spooler 112 until a time t8, and then output to the engine I/F 115. The process for the page 2 is started from a time t1 delayed from the process start time t0 of the page 1, and is then completed at a time t7. Likewise, the process for the page 3 is started at a time t2, the process for the page 4 is started at a time t3, and the process for the page 6 is started at a time t5. Therefore, in this example, the processes corresponding to the six pages are simultaneously performed in parallel during the period from the time t5 to the time 6. In this case, it is assumed for the purpose of explanation that the number of the CPU cores has been secured sufficiently. For example, on the premise that the two cores are used for the process of one page and the six pages are processed in parallel, it is assumed that the CPU having 12 cores or more is used.

In the example of FIG. 19, the page 3 is the page (heavy page) for which the process load is heavy. Further, the process for the page 3 is started at the time t2, and the intermediate progress can be grasped by the load level detecting unit 101 at the point when the time t5 passes. Although the high-speed intra-page processes are achieved by the parallel processes with the configuration of FIG. 6A in the third embodiment, there is a case where, depending on the load level, the process is not completed within a previously anticipated prescript time only by the above configuration. Therefore, in the third embodiment, also the core assignment depending on the load level is performed. Namely, as illustrated in FIG. 8, the acceleration process controlling unit 102 issues the instruction to raise the priority order of the thread of processing the heavy page. However, the CPU time in another thread is deprived only by, for example, raising the priority order of the thread used for the heavy page. For example, in the example of FIG. 19, if the priority order of the thread used for the page 3 is raised, the processes for the pages 1 and 2 to be performed after the time t5 are influenced. Therefore, in the third embodiment, the process time of the page following the heavy page is accommodated. In the example of FIG. 19, the acceleration process controlling unit issues the instruction to lower the priority order to the thread of processing the page 4.

When the acceleration controlling process like this is performed, the process of the page 3 which takes time up to a time to without the acceleration controlling process is completed at a time tb. As a result, the spool can be completed by a time t10 at which the data is output to the engine I/F 115.

As just described, according to the third embodiment, the accelerating and decelerating processes for each page are achieved by properly adjusting the thread priority order depending on the condition and/or situation of each page. Thus, it is possible to effectively prevent deterioration of the throughput of the printer engine.

Fourth Embodiment

Figure 20:
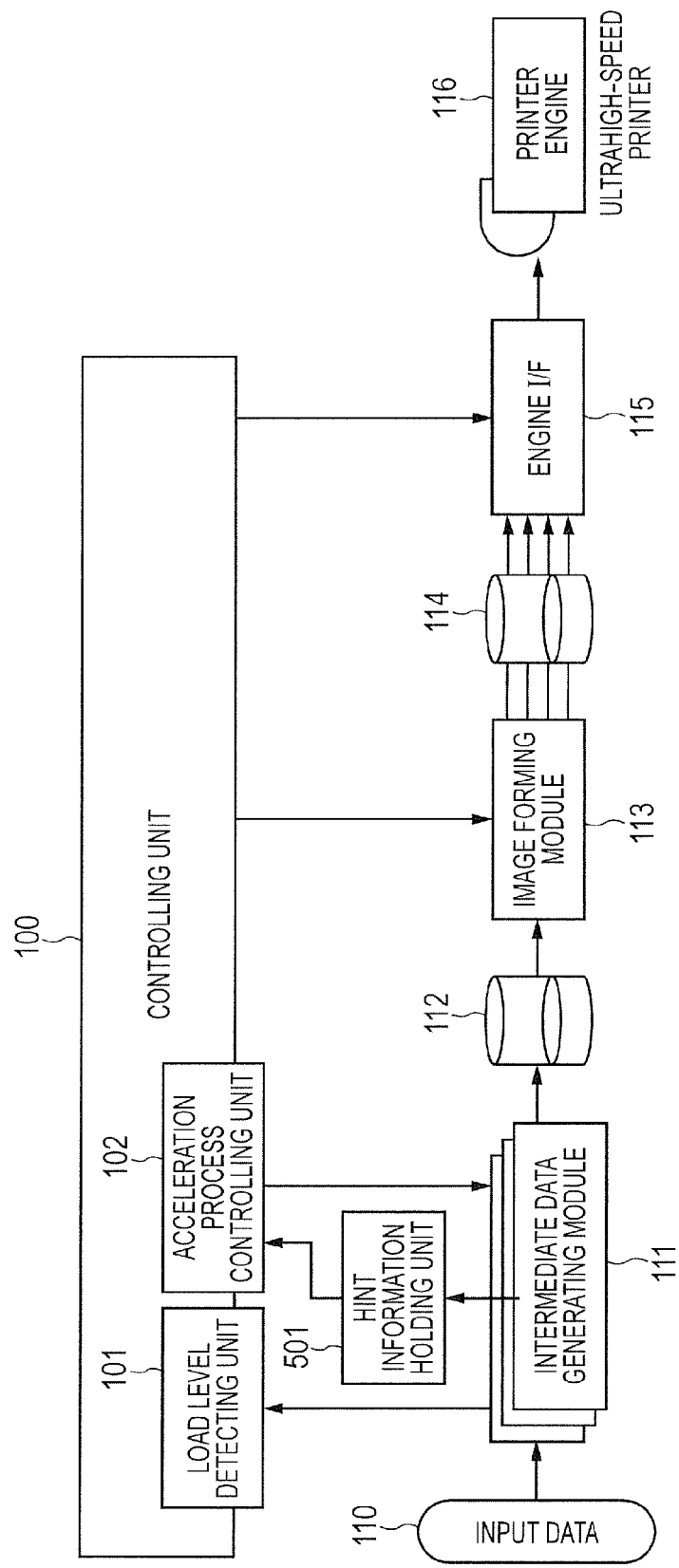
FIG. 20 is a block diagram illustrating a function constitution of an image processing apparatus according to the fourth embodiment.

Subsequently, the fourth embodiment will be described. In the fourth embodiment, the function constitution is different from that in the third embodiment. Namely, the constitution other than the above function constitution is the same as that in the third embodiment. FIG. 20 is a block diagram illustrating the function constitution of an image processing apparatus according to the fourth embodiment.

The image processing apparatus according to the fourth embodiment comprises a hint information holding unit 501 which holds therein hint information provided by an intermediate data generating module 111. An acceleration process controlling unit 102 appropriately changes the priority order of a thread depending on the load level detected by a lead level detecting unit 101. At that time, the acceleration process controlling unit designates the priority order based on the hint information held in the hint information holding unit 501.

Figure 21:
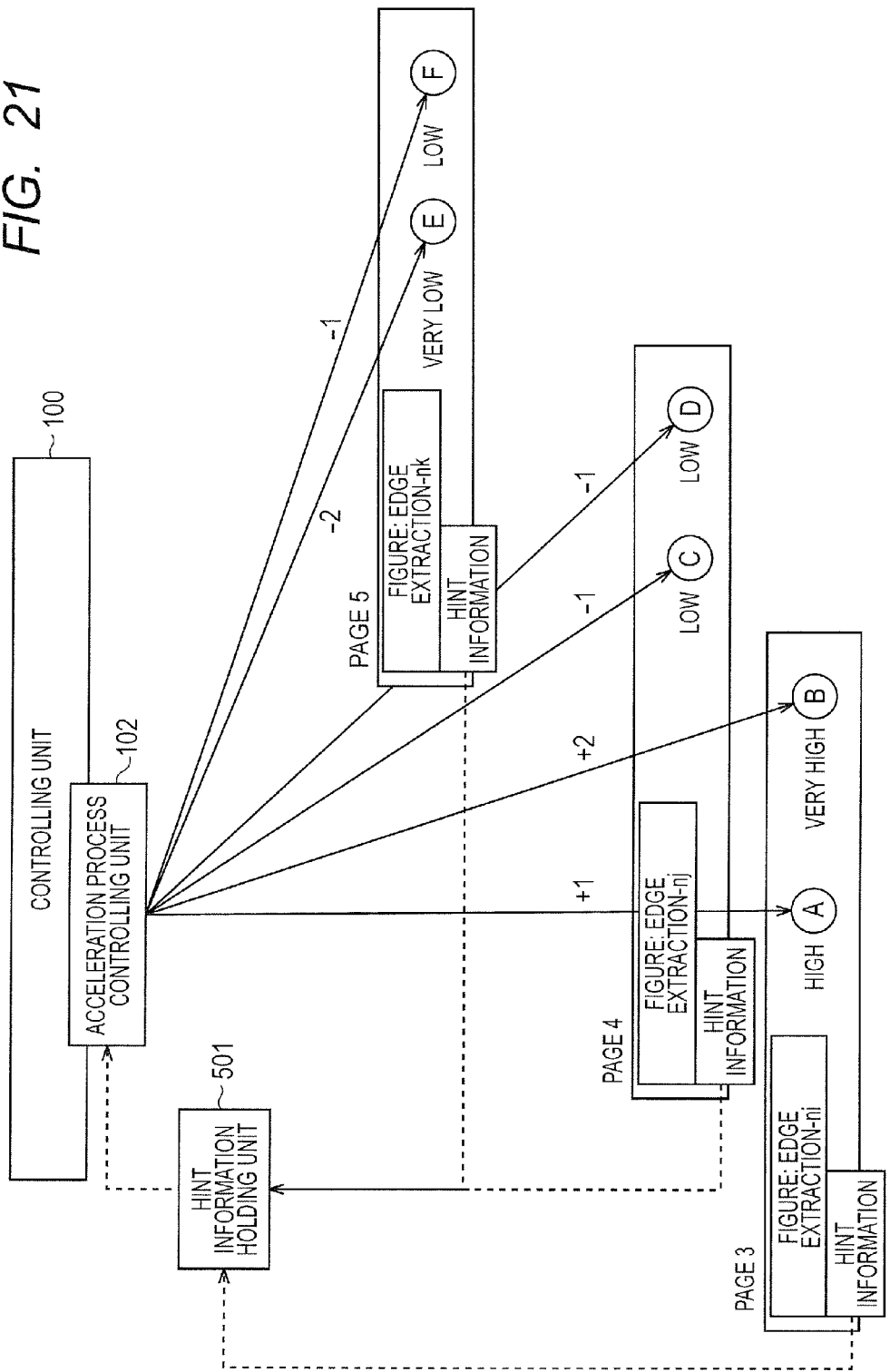
FIG. 21 is a diagram illustrating the operation of an acceleration process controlling unit according to the fourth embodiment.

FIG. 21 is a diagram illustrating the operation by the acceleration process controlling unit 102 according to the fourth embodiment. The acceleration process controlling unit 102 instructs to accelerate and decelerate the process speed for a process unit (a thread, a process, or the like). In FIG. 21, respective process units A, B, C, D, E and F are different process units. For example, FIG. 21 shows a case where the processes for pages 3, 4 and 5 are performed in the state that they overlap on the time axis. Here, on the side of a controlling unit 100, the edge extraction process for the figure is recognized as the set of the units called the threads. FIG. 21 shows the example that the process for the page 3 is performed in preference to the processes for the pages 4 and 5 with the objective of process speed. To achieve this operation, the acceleration process controlling unit 102 issues the instruction to raise the priority order of the thread of processing the page 3 so as to be higher than the priority orders of the threads of respectively processing the pages 3 and 4. That is, the acceleration process controlling unit 102 changes the schedule of the CPU core by changing the attribute parameter for controlling the thread. In other words, the assigned CPU time is changed per unit of thread.

In the fourth embodiment, the priority order can be designated by a natural number selected from "1" to "10", and the default standard value of the priority order has been designated as "5". Here, the larger the value of the priority order is, the higher the priority is. Namely, "10" is the highest priority.

As illustrated in FIG. 21, the processes are performed in the plurality of threads in the edge extracting process of the figure. It might be better to perform the process in the state that the priority has been slightly changed depending on the process condition, without uniformly raising the priority orders of the threads depending on a data condition or the like. For example, since the process time for the portion including many complex contours is longer than that for the portion including a simple contour, it is better to change the priority depending on the degree of such complexity. Therefore, in the present embodiment, such information as to the complexity is accumulated in each process system and held in a referable state by the hint information holding unit 501 as the hint information. Then, it is possible to control the value of the priority order of each thread by notifying the acceleration process controlling unit 102 of the held hint information.

In FIG. 21, in the page 3, the designated value in the thread of the process unit A is higher than that in the thread of the process unit B. That is, on the premise that the standard value is "5", the priority order of the thread of the process unit A is "6" because "+1" is instructed thereto, and the priority order of the thread of the process unit B is "7" because "+2" is instructed thereto. On the other hand, the priority orders of the threads in the pages 4 and 5 are lowered because "−1" and "−2" are instructed. Incidentally, when the process for the page 3 is ended, the priority order of each of the pages 4 and 5 is returned to the default standard value "5".

As described above, in the fourth embodiment, since the width of the values of the thread priority orders is widen, it is possible to achieve finer adjustment granularity, so that finer adjustment can be performed. Moreover, even if the current page, i.e., the page to be processed at the point, is a heavy page, the assistance is not requested uniformly to other pages. Namely, the degree of the assistance request is adjusted depending on the progress of each page at the point. In other words, the degree of the CPU time for which the accommodation is requested is adjusted depending on the progress of the process for each page.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-233765, filed Nov. 18, 2014, which is hereby incorporated by reference wherein in its entirety.

What is claimed is:

1. An image processing apparatus comprising:
one or more processors configured to:
perform processes of a plurality of pages in parallel;
assign a thread of an edge extraction process to one or more image data included in the page to be processed, and synthesize an edge of each image data extracted by the thread;
detect load levels of processes of the plurality of pages, for each page; and control the page processing depending on a result of the load level detection; and
designate priority of page threads including the assigned thread, depending on the result of the load level detection,
wherein the one or more processors are further configured to raise the priority of the thread of the page for which the load level has been detected as being higher than a threshold.

2. The image processing apparatus according to claim 1, wherein the load levels detection includes two or more standards of inspection process, and one standard is selected from the two or more standards of inspection process depending on an elapsed time from a process start.

3. The image processing apparatus according to claim 1, wherein the one or more processors are further configured to lowers the priority of one or more of the threads for processing the pages different from the page for which the load levels have been detected as being higher than the threshold.

4. The image processing apparatus according to claim 3, further comprising a plurality of cores, wherein
in case of lowering the priority of one or more of the threads, the one or more processors are further configured to extract the thread for which the priority can be lowered by referring to a relation of connections among the plurality of cores.

5. The image processing apparatus according to claim 3, further comprising a plurality of cores, wherein
in case of lowering the priority of one or more of the threads, the one or more processors are further configured to extract the thread for which the priority can be lowered by referring to a relative relation of process speed among the plurality of cores.

6. The image processing apparatus according to claim 1, further comprising:
a spooler configured to spool synthesized data; and
form an image by reading the data from the spooler.

7. An image processing method comprising:
performing processes of a plurality of pages in parallel;
assigning a thread of an edge extraction process to one or more image data included in the page to be processed, and synthesizing an edge of each image data extracted by the thread:
detecting load levels in processes of the plurality of pages, for each page;
performing control of the page processes depending on a detection result in the load detecting;
designating priority of page threads including the assigned thread, depending on a result of the detecting of a load level; and raising the priority of the thread of the page for which the load level has been detected as being higher than a threshold.

8. A non-transitory computer-readable storage medium storing a program for causing a computer to perform an image processing method, the method comprising:

performing processes of a plurality of pages in parallel;

assigning a thread of an edge extraction process to one or more image data included in the page to be processed, and synthesizing an edge of each image data extracted by the thread;

detecting load levels in processes of the plurality of pages, for each page;

performing control of the page processes depending on a detection result in the load detecting;

designating priority of page threads including the assigned thread, depending on a result of the detecting of a load level; and raising the priority of the thread of the page for which the load level has been detected as being higher than a threshold.

* * * * *